United States Patent
Wang

(10) Patent No.: US 12,541,203 B2
(45) Date of Patent: Feb. 3, 2026

(54) REGIONAL MAP DRAWING METHOD AND APPARATUS, MEDIUM, AND ELECTRONIC DEVICE

(71) Applicant: Beijing Roborock Innovation Technology Co., Ltd., Beijing (CN)

(72) Inventor: Lei Wang, Beijing (CN)

(73) Assignee: Beijing Roborock Innovation Technology Co., Ltd., Beijing (CN)

( * ) Notice: Subject to any disclaimer, the term of this patent is extended or adjusted under 35 U.S.C. 154(b) by 264 days.

(21) Appl. No.: 18/264,944

(22) PCT Filed: Feb. 10, 2022

(86) PCT No.: PCT/CN2022/075770
§ 371 (c)(1),
(2) Date: Aug. 10, 2023

(87) PCT Pub. No.: WO2022/171157
PCT Pub. Date: Aug. 18, 2022

(65) Prior Publication Data
US 2024/0053762 A1     Feb. 15, 2024

(30) Foreign Application Priority Data
Feb. 10, 2021   (CN) .......................... 202110184840.8

(51) Int. Cl.
*G05D 1/00* (2024.01)
*A47L 11/40* (2006.01)

(52) U.S. Cl.
CPC ........ *G05D 1/0274* (2013.01); *A47L 11/4011* (2013.01); *G05D 1/024* (2013.01); *A47L 2201/04* (2013.01)

(58) Field of Classification Search
CPC .. G05D 1/0274; G05D 1/024; G05D 2105/10; G05D 2107/40; G05D 2109/10;
(Continued)

(56) References Cited

U.S. PATENT DOCUMENTS

| | | | |
|---|---|---|---|
| 9,026,302 B2 * | 5/2015 | Stout | G05D 1/0257 701/25 |
| 2006/0020369 A1 * | 1/2006 | Taylor | A47L 9/009 318/568.12 |

(Continued)

FOREIGN PATENT DOCUMENTS

| | | | | |
|---|---|---|---|---|
| CN | 105702151 A | | 6/2016 | |
| CN | 108106616 A | * | 6/2018 | .......... G01C 21/206 |

(Continued)

OTHER PUBLICATIONS

International Search Report from PCT/CN2022/075770 dated May 16, 2022.

(Continued)

*Primary Examiner* — Tuan C To
*Assistant Examiner* — Dominick Mulder
(74) *Attorney, Agent, or Firm* — Calfee, Halter & Griswold LLP

(57) ABSTRACT

The present disclosure relates to a regional map drawing method, a computer readable storage medium, and an electronic device. The method includes: when an automatic cleaning device draws a room map along a wall in a first surface medium region, if a second surface medium region is detected, ignoring the second surface medium region and continuing to draw the room map; after the room map is completely drawn, controlling the automatic cleaning device to enter a boundary drawing mode for the second surface medium region, and determining a distance between a near-wall boundary of the second surface medium region and a wall surface; and if the distance is within a preset range, controlling the automatic cleaning device to scan the near-wall boundary of the second surface medium region in a direction opposite to a wall-edge cleaning direction.

20 Claims, 11 Drawing Sheets

Ignore a second surface media area to continue to draw a room map, if the second surface media area is detected when the room map is drawn by an autonomous cleaning device along a wall in a first surface media area   — S2010

Control the autonomous cleaning device to enter a boundary drawing mode for the second surface media area, and determine a distance between the wall and a boundary of the second surface media area that is near to the wall, after drawing of the room map is finished   — S2020

Control the autonomous cleaning device to scan, in a direction opposite to a direction in which the room map is drawn along the wall, the boundary of the second surface media area that is near to the wall, to draw a second surface media area map, if the distance between the wall and the boundary of the second surface media area that is near to the wall is within a preset range   — S2030

(58) Field of Classification Search
CPC ........ G05D 1/246; G05D 1/628; G05D 1/242; A47L 11/4011; A47L 2201/04; A47L 2201/06; A47L 11/4072; A47L 11/282; A47L 11/24; A47L 11/284; A47L 11/32; A47L 11/4008; A47L 11/4055; A47L 11/4061; Y02D 10/00
USPC .......................................................... 701/25
See application file for complete search history.

(56) References Cited

U.S. PATENT DOCUMENTS

| | | | |
|---|---|---|---|
| 2012/0125363 | A1 | 5/2012 | Kim et al. |
| 2018/0039275 | A1* | 2/2018 | Yun .................. A47L 9/009 |
| 2018/0052468 | A1* | 2/2018 | Choe .................. G05D 1/0274 |
| 2018/0353043 | A1 | 12/2018 | Erkek et al. |
| 2018/0364045 | A1* | 12/2018 | Williams ................ G01S 17/88 |
| 2019/0015985 | A1* | 1/2019 | Kim .................. B25J 9/1666 |
| 2019/0320866 | A1* | 10/2019 | Thorne ................ A47L 9/2852 |
| 2019/0332121 | A1* | 10/2019 | Kim .................. G06V 10/145 |
| 2020/0345193 | A1* | 11/2020 | Lu .................. G05D 1/0088 |
| 2020/0379115 | A1 | 12/2020 | Yang et al. |
| 2021/0124354 | A1* | 4/2021 | Munich .................. G05D 1/227 |
| 2021/0131822 | A1* | 5/2021 | Artes .................. G05D 1/0225 |
| 2021/0365041 | A1 | 11/2021 | Lee et al. |
| 2022/0026920 | A1* | 1/2022 | Ebrahimi Afrouzi .... G06N 7/01 |
| 2022/0047135 | A1* | 2/2022 | Lee .................. A47L 11/4061 |

FOREIGN PATENT DOCUMENTS

| | | | | |
|---|---|---|---|---|
| CN | 108143364 | A | | 6/2018 |
| CN | 108885453 | A | | 11/2018 |
| CN | 109195751 | A | | 1/2019 |
| CN | 109871420 | A | | 6/2019 |
| CN | 110200549 | A | | 9/2019 |
| CN | 110286669 | A | | 9/2019 |
| CN | 111166249 | A | | 5/2020 |
| CN | 111643014 | A | | 9/2020 |
| CN | 211559963 | U | | 9/2020 |
| CN | 111973075 | A | | 11/2020 |
| CN | 112053415 | A | | 12/2020 |
| CN | 112137509 | A | | 12/2020 |
| CN | 112352244 | A | | 2/2021 |
| CN | 212489787 | U * | 2/2021 | ........... G05D 1/2246 |
| CN | 113693493 | A | | 11/2021 |
| JP | 2010054315 | A | | 3/2010 |
| KR | 20200027070 | A | | 3/2020 |

OTHER PUBLICATIONS

Notice of Allowance from Chinese Application No. 202110184840.8 dated Dec. 5, 2022.

Office action from Chinese Application No. 202110184840.8 dated May 18, 2022.

* cited by examiner

REGIONAL MAP DRAWING METHOD AND APPARATUS, MEDIUM, AND ELECTRONIC DEVICE

CROSS-REFERENCE TO RELATED APPLICATION

This application is the 371 application of PCT Application No. PCT/CN2022/075770, filed on Feb. 10, 2022, which is based on and claims priority to the Chinese Patent Application No. 202110184840.8, filed on Feb. 10, 2021, which is incorporated herein by reference in its entirety.

TECHNICAL FIELD

The present disclosure relates to the field of smart home, and more particularly to a method for drawing an area map, a device for drawing an area map, a computer-readable storage medium and an electronic device.

BACKGROUND ART

In recent years, with the rapid development of computer technologies and artificial intelligence science, intelligent robot technologies have gradually become a hotspot in the field of modern robotics research. A sweeping robot, as one of the most practical intelligent robots, can automatically complete cleaning the floor by virtue of certain artificial intelligence.

SUMMARY OF THE INVENTION

The present disclosure provides a method for drawing an area map, a device for drawing an area map, a computer-readable storage medium and an electronic device.

According to embodiments of the present disclosure, in a first aspect, the present disclosure provides a method for drawing an area map, including:
  ignoring a second surface media area to continue to draw a room map, if the second surface media area is detected when the room map is drawn by an autonomous cleaning device along a wall in a first surface media area;
  controlling the autonomous cleaning device to enter a boundary drawing mode for the second surface media area, and determining a distance between the wall and a near-wall boundary of the second surface media area, after drawing of the room map is finished; and
  controlling the autonomous cleaning device to scan, in a direction opposite to a direction in which the room map is drawn along the wall, the near-wall boundary of the second surface media area, to draw a second surface media area map, if the distance between the wall and the near-wall boundary of the second surface media area is within a preset range.

In a second aspect, the present disclosure provides a computer-readable storage medium having a computer program stored thereon which, when executed by a processor, implements the method for drawing the area map as described above.

In a third aspect, the present disclosure provides an electronic device, including:
  a processor; and
  a memory, configured to store executable instructions of the processor,
wherein the processor is configured to perform the method for drawing the area map as described above by executing the executable instructions.

BRIEF DESCRIPTION OF THE DRAWINGS

The accompanying drawings here, which are incorporated in the Description and constitute a part of the Description, show embodiments conforming to the present disclosure, and are used to explain the principles of the present disclosure together with the Description. Apparently, the accompanying drawings in the following description are only some embodiments of the present disclosure, and for those of ordinary skills in the art, other drawings may also be obtained from these accompanying drawings without creative efforts. In the accompanying drawings.

DETAILED DESCRIPTION

Figure 1:
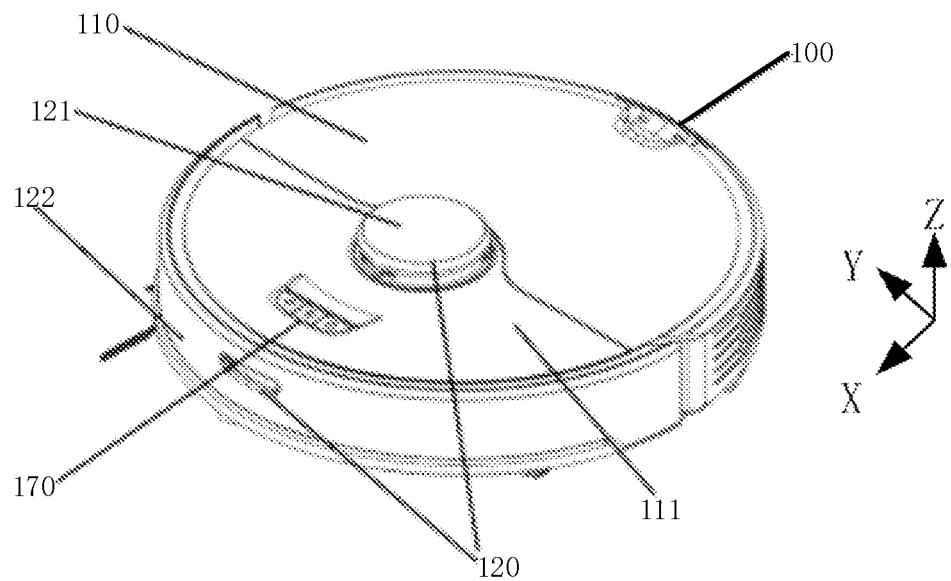
FIG. 1 is an oblique view of an autonomous cleaning device according to an embodiment of the present disclosure.

In order to make objectives, technical solutions and advantages of the present disclosure clearer, the present disclosure will be further described in detail below with reference to the accompanying drawings. Obviously, the described embodiments are only a part of embodiments of the present disclosure, rather than all the embodiments of the present disclosure. Based on the described embodiments in the present disclosure, all other embodiments obtained by those ordinary skilled in the art without creative efforts shall fall within the protection scope of the present disclosure.

The terms used in embodiments of the present disclosure are only for the purpose of describing specific embodiments, and are not intended to limit the present disclosure. Singular forms of "a", "said" and "the" used in embodiments of the present disclosure and the appended claims are also intended to include plural forms, unless the context clearly indicates other meanings. "Multiple" or "a plurality of" generally means at least two.

It should be understood that the term "and/or" used herein is only indicative of an association relationship among the associated objects, and represents that there may be three relationships. For example, A and/or B may represent that: A exists alone, A and B exist simultaneously, and B exists alone. In addition, the character "/" herein generally indicates that the associated objects listed before and after the character are in an "or" relationship.

It should be understood that although the terms first, second, third, etc. may be used refer to several components in embodiments of the present disclosure, these components should not be limited to these terms. These terms are only intended to distinguish these components. For example, without departing from the scope of embodiments of the present disclosure, the first component can also be referred to as the second component, and similarly, the second component can also be referred to as the first component.

Depending on the context, the word "if" as used herein can be interpreted as "when" or "upon" or "in response to". Similarly, depending on the context, the phrase "if it is determined" or "if it is detected" may be interpreted as "when it is determined", "in response to determination", "upon determination", or "in response to detection", and the phrase "if it is detected" may be interpreted as "when it is detected", "upon detection", or "in response to detection".

It should also be noted that the terms "including", "comprising" or any other variation thereof are intended to cover non-exclusive inclusion, so that a product or a device that includes a series of elements not only includes those elements, but also includes those that are not explicitly listed or elements inherent to such product or device. Without more restriction, an element defined by the sentence "including a/an . . . " does not exclude the existence of other identical elements in the product or device that includes such element.

Figure 2:
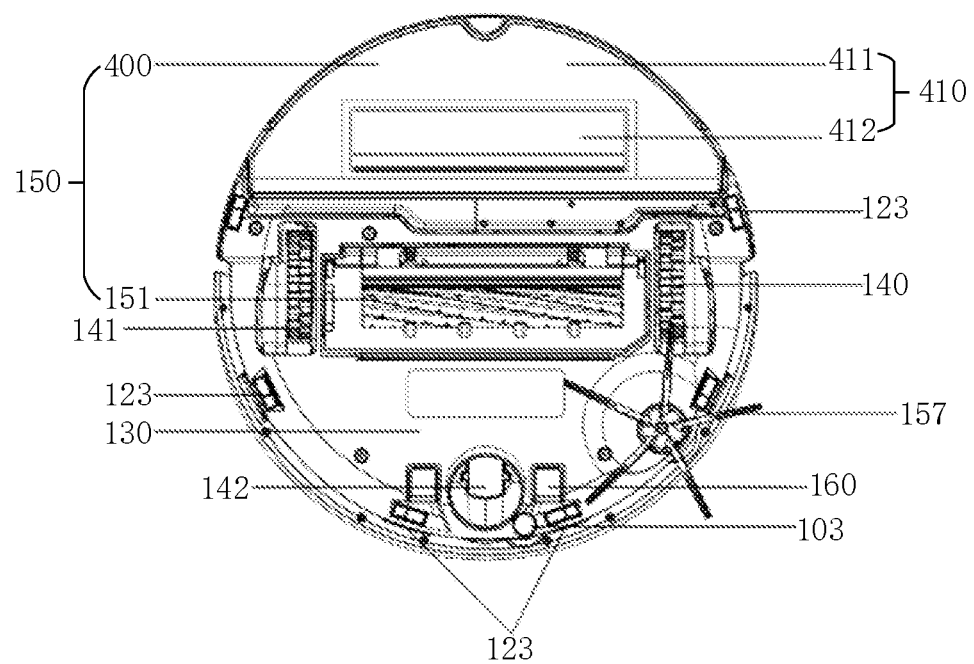
FIG. 2 is a schematic structural diagram of a bottom part of an autonomous cleaning device according to an embodiment of the present disclosure.

FIGS. 1 to 2 illustrate schematic structural view of an autonomous cleaning device according to an embodiment of the present disclosure. As illustrated in FIGS. 1 to 2, the autonomous cleaning device may be a vacuum suction robot, a mopping/brushing robot, or a window cleaning robot, etc. The autonomous cleaning device may include a mobile platform 100, a sensing system 120, a control system 130, a driving system 140, a cleaning module 150, a power system 160, and a human-computer interaction system 170.

The mobile platform 100 may be configured to autonomously move in a target direction on an operation surface. The operation surface may be a surface to be cleaned by the autonomous cleaning device. In some embodiments of the present disclosure, the autonomous cleaning device may be a mopping robot, and the autonomous cleaning device operates on a floor, i.e., the floor being the operation surface. The autonomous cleaning device may further be a window cleaning robot, where the autonomous cleaning device operates on a outer glass surface of a building, and the glass is the operation surface. The autonomous cleaning device may further be a pipe cleaning robot, where the autonomous cleaning device operates on an inner surface of the pipe, and the inner surface of the pipe is the operation surface. Merely for the purpose of demonstration, the following description in the present disclosure takes the mopping robot as an example.

In some embodiments of the present disclosure, the mobile platform 100 may be an autonomous mobile platform or a non-autonomous mobile platform. The autonomous mobile platform means that the mobile platform 100 may make operational decisions autonomously and adaptively on its own based on unexpected environment inputs. The non-autonomous mobile platform cannot make the operational decisions adaptively on its own based on the unexpected environment inputs, but may execute established procedures or operate in accordance with certain logic. Accordingly, when the mobile platform 100 is a autonomous mobile platform, the target direction may be determined autonomously by the autonomous cleaning device. When the mobile platform 100 is a non-autonomous mobile platform, the target direction may be set by a system or manually. When the mobile platform 100 is an autonomous mobile platform, the mobile platform 100 includes a front part 111 and a rear part 110.

The sensing system 120 includes sensing devices, such as a location determination device 121 located on the mobile platform 100, a buffer 122 located at the front part 111 of the mobile platform 100, a cliff sensor 123 and an ultrasonic sensor (not illustrated in the figures) located at a bottom part of the mobile platform, an infrared sensor (not illustrated in the figures), a magnetometer (not illustrated in the figures), an accelerometer (not illustrated in the figures), a gyroscope (not illustrated in the figures), an odometer (not illustrated in the figures) and the like, and provides various location information and motion state information of the robot to the control system 130.

In order to describe the operation of the autonomous cleaning device more clearly, directions are defined as follows. The autonomous cleaning device may travel on the floor through various combinations of movement relative to the following three mutually perpendicular axes as defined by the mobile platform 100: a transverse axis x, a front-rear axis y, and a center vertical axis z. A forward driving direction along the front-rear axis y is denoted as being "forward", and a rearward driving direction along the front-rear axis y is denoted as being "rearward". The transverse axis x essentially extends between a right wheel and a left wheel of the autonomous cleaning device along an axis passing through a center point of the driving wheel assembly 141. The autonomous cleaning device can rotate around the x-axis. When the front part of the autonomous cleaning device is inclined upward and the rear part is inclined downward, it is referred as being "pitching upward". When the front part of the autonomous cleaning device is inclined downward, and the rear part is inclined upward, it is referred as being "pitching downward". In addition, the autonomous cleaning device may rotate around the z-axis. Along the forward direction of the autonomous cleaning device, when the autonomous cleaning device is inclined toward right side of the y-axis, it is referred as being "turning right", and when the autonomous cleaning device is inclined toward left side of the y-axis, it is referred as being "turning left".

As illustrated in FIG. 2, the cliff sensors 123 are disposed at the bottom part of the mobile platform 100 and also in front of and behind a driving wheel assembly 141. The cliff sensors 123 are configured to prevent the autonomous cleaning device from falling when it moves backwards, thereby avoiding damages to the autonomous cleaning device. The aforementioned wording "front" refers to a side in a direction same as a travelling direction of the autonomous cleaning device, and the aforementioned wording "behind" refers to a side in a direction opposite to the travelling direction of the autonomous cleaning device.

The location determination device 121 includes, but is not limited to, a camera and a Laser Direct Structuring (LDS).

Various components of the sensing system 120 may operate independently or cooperate with each other to achieve an intended function more accurately. The cliff sensor 123 and the ultrasonic sensor identify the surface to be cleaned, so as to determine physical properties of the surface to be cleaned, including a surface media, degree of cleanliness, etc. Further, a more accurate determination may be made in combination with a camera, the laser distance sensor, and etc.

For example, the ultrasonic sensor may determine whether the surface to be cleaned is a carpet. If the ultrasonic sensor determines that the surface to be cleaned is a material of carpet, the control system 130 controls the autonomous cleaning device to perform cleaning in a carpet cleaning mode.

The front part 111 of the mobile platform 100 is provided with a buffer 122. When the driving wheel assembly 141 drives the autonomous cleaning device to travel on the floor during a cleaning process, the buffer 122 detects one or more events (or objects) along a travelling path of the autonomous cleaning device by a sensor system, such as an infrared sensor. The autonomous cleaning device may control the driving wheel assembly 141, based on the events (or objects) detected by the buffer 122, such as obstacles and walls, such that the autonomous cleaning device responds to the events (or objects), such as moving away from the obstacles.

The control system 130 is disposed on a main circuit board in the mobile platform 100, and includes a computing processor, such as a central processing unit, an application processor, in communication with a non-transitory memory, such as a hard disk, a flash memory, a random access memory. The application processor is configured to: receive environment information perceived by the multiple sensors and transmitted by the sensing system 120; create a simultaneous map of the environment where the autonomous cleaning device is located through a locating algorithm such as simultaneous localization and mapping (SLAM), according to obstacle information fed back by the laser distance sensor; autonomously determine a travelling path according to the environment information and the environment map; and then control the driving system 140 to perform operations such as moving forward, moving backward, and/or steering according to the autonomously determined travelling path. Further, the control system 130 may further determine whether to start the cleaning module 150 to perform a cleaning operation according to the environment information and the environment map.

In some embodiment of the present disclosure, in combination with distance information and speed information fed back by the sensing device such as the buffer 122, the cliff sensor 123, the ultrasonic sensor, the infrared sensor, the magnetometer, the accelerometer, the gyroscopes, and the odometer, the control system 130 may determine comprehensively which operation state the autonomous cleaning device is currently in, such as crossing a threshold, moving onto a carpet, being on a cliff, getting stuck at the top or bottom part, a full dust box, being picked up, etc. And further, the control system provides detailed next action strategy for different situations, so that the operation of the autonomous cleaning device conforms to the owner's requirements and provides enhanced user experience. Furthermore, the control system may plan an efficient and reasonable cleaning path and cleaning mode based on the real-time map information created by SLAM, which greatly improves the cleaning efficiency of the autonomous cleaning device.

Figure 3:
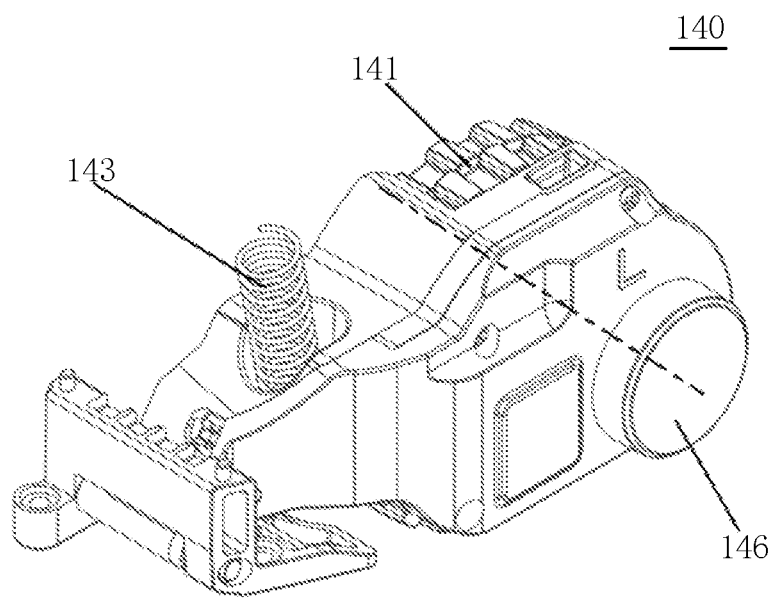
FIG. 3 is an oblique view of a side driving wheel assembly according to an embodiment of the present disclosure.
Figure 4:
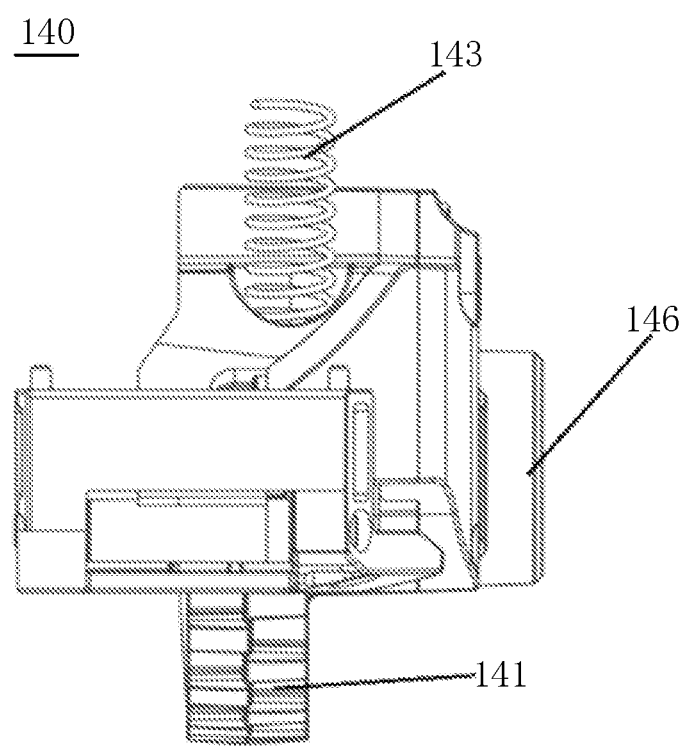
FIG. 4 is a front view of a side driving wheel assembly according to an embodiment of the present disclosure.

The driving system 140 may execute a driving instructions based on distance and angle information (for example, x, y, and θ components), so as to manipulate the autonomous cleaning device to travel across the floor. FIGS. 3 and 4 illustrate respectively an oblique view and a front view of a side driving wheel assembly 141 according to an embodiment of the present disclosure. As illustrated in the figures, the driving system 140 includes the driving wheel assembly 141, and may control the left and right wheels at the same time. In order to more accurately control the motion of the robot, the driving system 140 may include a left driving wheel assembly and a right driving wheel assembly. The left and right driving wheel assemblies are symmetrically disposed along a transverse axis defined by the mobile platform 100. The driving wheel assembly includes a housing and a connection frame. The driving wheel assemblies are provided with a driving motor 146 respectively. The driving motor 146 is located outside the driving wheel assembly 141, and an axis of the driving motor 146 is located within a cross-sectional projection of the driving wheel assembly. The driving wheel assembly 141 may further be connected to a circuit configured to measure a driving current and the odometer.

The autonomous cleaning device may include one or more steering assembly 142, so as to make the autonomous cleaning device to move more stably on the floor or have stronger motion ability. The steering assembly may be a driven wheel or a driving wheel, and a structure of the steering assembly includes, but is not limited to, universal wheels. The steering assembly 142 may be located in front of the driving wheel assembly 141.

The driving motor 146 provides power for rotation of the driving wheel assembly 141 and/or the steering assembly 142.

The driving wheel assembly 141 may be detachably connected to the mobile platform 100, which is convenient for disassembly, assembly, and maintenance. The driving wheel may have a suspension system of biased drop type. The driving wheel is fastened in a movable mode, for example, attached in a rotatable mode, to the mobile platform 100 of the autonomous cleaning device, and maintains contact with the floor and traction due to a certain grounding force through an elastic element 143, such as a tension spring or a compression spring. In addition, the cleaning module 150 of the autonomous cleaning device further contacts the surface to be cleaned with a certain pressure.

The power system 160 includes a rechargeable battery, such as a nickel-metal hydride battery and a lithium battery. The rechargeable battery may be connected to a charging control circuit, a battery pack charging temperature detection circuit, and a battery undervoltage monitoring circuit. The charging control circuit, the battery pack charging temperature detection circuit, and the battery undervoltage monitoring circuit are then connected to the single-chip micro-controller circuit. The autonomous cleaning device is connected to a charging station through a charging electrode disposed at a side or below a device body for charging.

The human-computer interaction system 170 includes a button on a host panel for the user to select functions. The human-computer interaction system 170 may further include a display screen and/or an indicator light and/or a speaker. The display screen, the indicator light and the speaker provide the user with the current state of the robot or the function selection options. The human-computer interaction system 170 may further include programs for a mobile client. For a cleaning device of path-navigation type, the mobile client may provide the user with a map of the environment where the device is located, and the location of the robot, thus providing the user with rich and user-friendly functions.

The cleaning module 150 may include a dry cleaning module 151 and/or a wet cleaning module 400.

As illustrated in FIGS. 5-8, the dry cleaning module 151 may include a rolling brush, a dust box, a fan, and an air outlet. The rolling brush that has a certain interaction with the floor sweeps garbage on the floor and rolls it to the front of a dust suction port between the rolling brush and the dust box. Then, the garbage is sucked into the dust box by the suction gas generated by the fan and passing through the dust box. The dust removal capacity of the sweeper may be characterized by dust pickup efficiency (DPU) of garbage. The dust pickup efficiency DPU is affected by the structure and material of the rolling brush, and is further affected by the dust suction port, the dust container, the fan, the air outlet, and air utilization of the air duct formed by connection parts between these four components. Further, the dust pickup efficiency DPU is also affected by the type and power of the fan. This is a complicated system scheme problem. Compared with an ordinary plug-in vacuum cleaner, improvement of dust removal capacity is of greater significance to the autonomous cleaning device with limited power. The improvement of dust removal capacity reduces the power requirements directly and effectively. That is to say, an robot that can clean a floor of 80 square meters with a single charge previously may evolve into a single charge for cleaning a floor of 180 square meters or more. In addition, the service life of the battery with less recharges will also be greatly increased, so that replacement frequency of the battery by the user will also be decreased. The improvement of dust removal capability is obvious and direct user experience, and the user may directly draw a conclusion about whether the sweeping/mopping is clean. The dry cleaning module may further include a side brush 157 having a rotation shaft, wherein the rotation shaft is at a certain angle with respect to the floor, for moving scraps to sweeping area of a rolling brush of the cleaning module 150.

Figure 5:
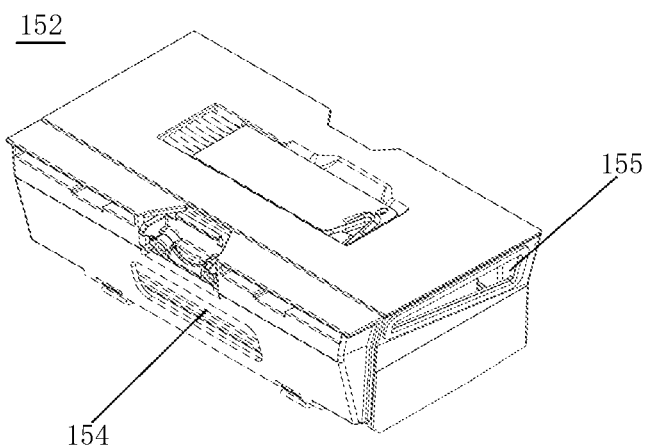
FIG. 5 is an oblique view of a dust box according to an embodiment of the present disclosure.
Figure 6:
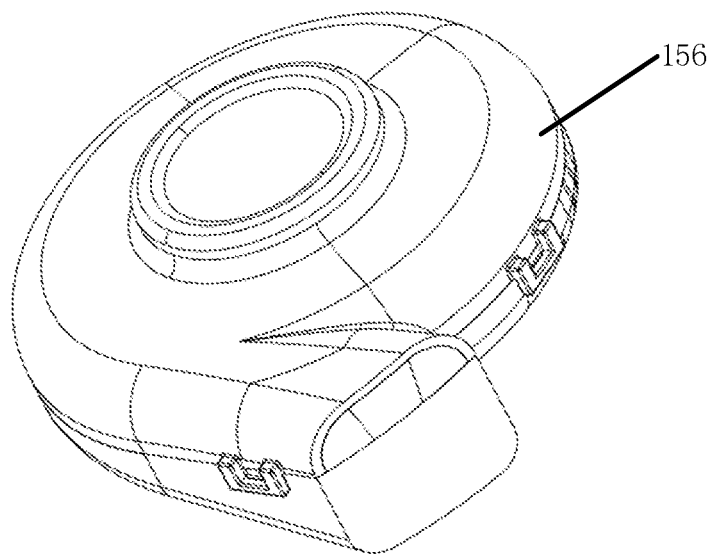
FIG. 6 is an oblique view of a fan according to an embodiment of the present disclosure.
Figure 7:
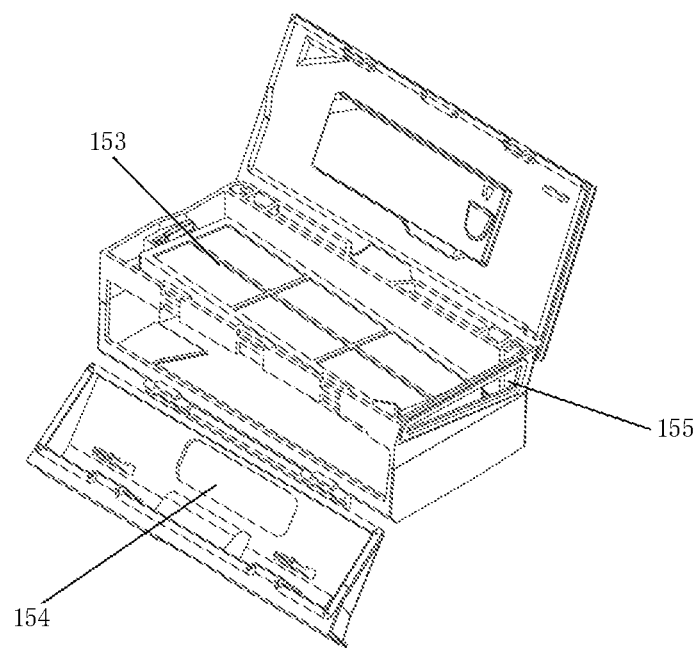
FIG. 7 is a schematic diagram of a dust box in an open state according to an embodiment of the present disclosure.
Figure 8:
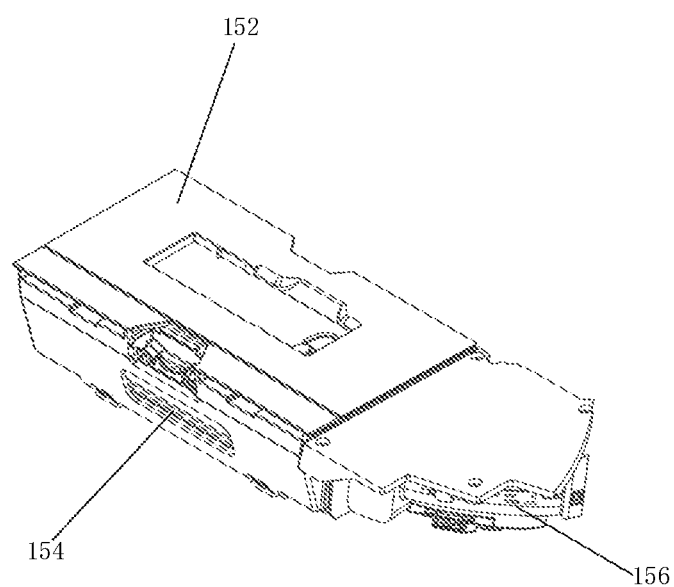
FIG. 8 is a schematic diagram of a dust box and a fan in an assembled state according to an embodiment of the present disclosure.

FIG. 5 illustrates a schematic structural view of the dust box 152 of the dry cleaning module, FIG. 6 illustrates a schematic structural view of the fan 156 of the dry cleaning module, FIG. 7 illustrates a schematic view of the dust box 152 in an opened state, and FIG. 8 illustrates a schematic view of a dust box and a fan in an assembled state.

The roller brush, which has a certain interaction with the floor, sweeps the garbage on the floor and rolls it to the front of a dust suction port 154 between the roller brush and the dust box 152. The garbage is then sucked into the dust box 152 by the suction gas generated by the fan 156 and passing through the dust box 152. The garbage is separated by a filter 153 at a side inside the dust box 152 near the dust suction port 154. The filter 153 completely separates the dust suction port from an air outlet. The filtered air enters the fan 156 through the air outlet 155.

Typically, the dust suction port 154 of the dust box 152 is located in front of the robot, the air outlet 155 is located on a side of the dust box 152, and the suction port of the fan 156 abuts the air outlet of the dust box.

A front panel of the dust box 152 may be opened for cleaning the garbage in the dust box 152.

The filter 153 and a container body of the dust box 152 are detachably connected to facilitate detachment and cleaning of the filter.

Figure 9:
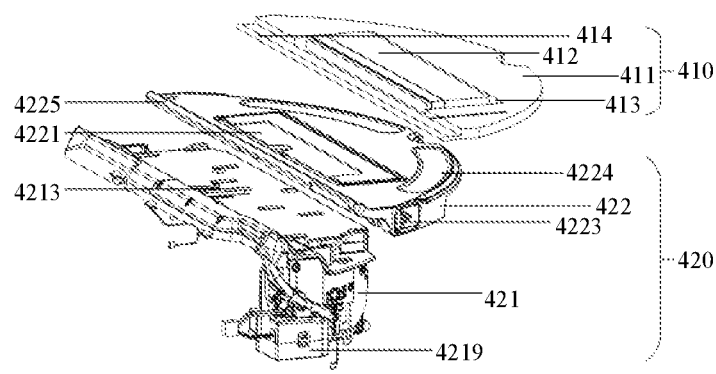
FIG. 9 is an exploded view of an autonomous cleaning device according to an embodiment of the present disclosure.
Figure 10:
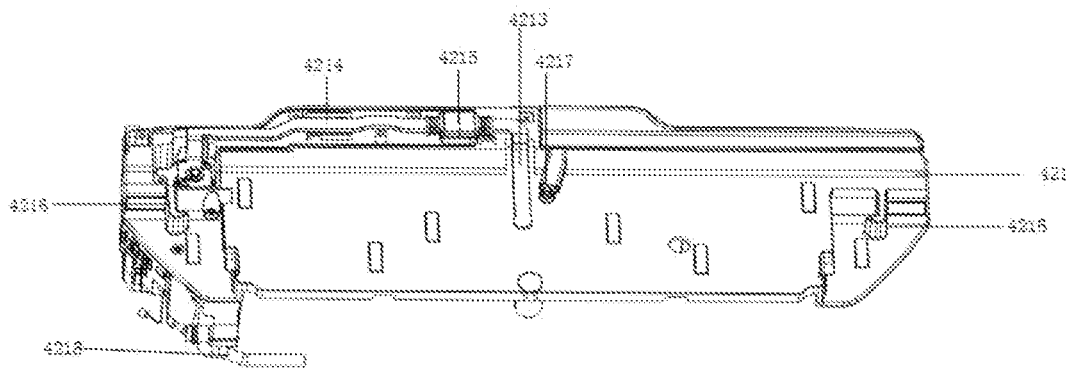
FIG. 10 is a structural diagram of a support platform of an autonomous cleaning device according to an embodiment of the present disclosure.
Figure 11:
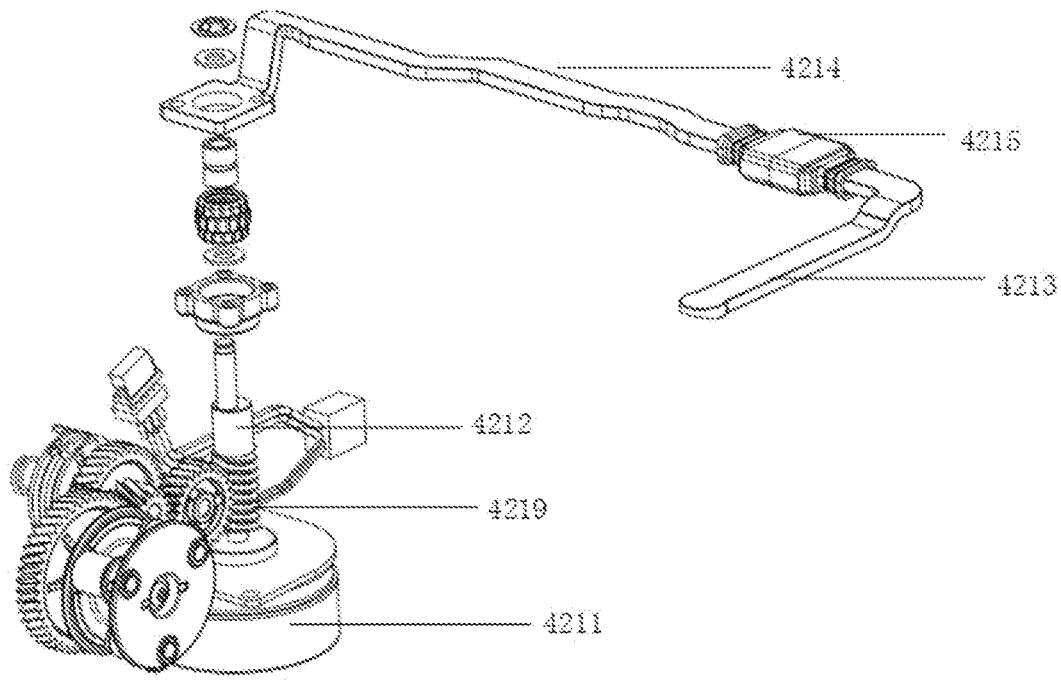
FIG. 11 is a structural diagram of a vibration member of an autonomous cleaning device according to an embodiment of the present disclosure.

As illustrated in FIGS. 9-11, the wet cleaning module 400 in embodiments of the present disclosure is configured to clean at least part of the operation surface in a wet cleaning mode. The wet cleaning module 400 includes a cleaning head 410 and a driving unit 420. The cleaning head 410 is configured to clean at least part of the operation surface, and the driving unit 420 is configured to drive the cleaning head 410 to conduct a reciprocating movement on a target surface. The target surface is part of the operation surface. The cleaning head 410 conducts reciprocating movement on the surface to be cleaned, and a contact surface of the cleaning head 410 in contact with the surface to be cleaned is provided with a cleaning cloth or a cleaning base plate, which leads to high-frequency friction with respect to the surface to be cleaned through the reciprocating movement, thereby removing stains from the surface to be cleaned. The reciprocating movement may be repeated motions along any one or more directions within the operation surface. Alternatively, it may be vibrations perpendicular to the operation surface.

As illustrated in FIG. 9, the driving unit 420 includes: a driving platform 421, connected to a bottom surface of the mobile platform 100 and configured to provide a driving force; and a support platform 422, detachably connected to the driving platform 421 and configured to support the cleaning head 410, wherein the support platform 422 moves upwards or downwards under driving of the driving platform 421.

A lifting module is disposed between the cleaning module 150 and the mobile platform 100, such that the cleaning module 150 is in a good contact with the surface to be cleaned, or different cleaning modes are provided for the surface to be cleaned of different materials.

The dry cleaning module 151 may be connected to the mobile platform 100 through a passive lifting module. When the cleaning device encounters an obstacle, the dry cleaning module 151 may cross over the obstacle through the lifting module more conveniently.

The wet cleaning module 400 may be connected to the mobile platform 100 through an active lifting module. When the wet cleaning module 400 is out of operation temporarily, or when the wet cleaning module 400 cannot be clean the surface to be cleaned, the wet cleaning module 400 may be raised up by the active lifting module and separated from the surface to be cleaned, so as to change the cleaning mode.

As illustrated in FIGS. 10-11, the driving platform 421 includes: a motor 4211, disposed at a side of the driving platform 421 close to the mobile platform 100 and configured to output power through an output shaft of the motor; a driving wheel 4212, connected to the output shaft of the motor and having an asymmetrical structure; and a vibration member 4213, disposed at a side of the driving platform 421 opposite to the motor 4211 and connected to the driving wheel 4212, so that reciprocating movement of the vibration member 4213 may be achieved under the asymmetrical rotation of the driving wheel 4212.

The driving platform 421 may further include a driving wheel and a gear mechanism. The gear mechanism 235 may connect the motor 4211 and the driving wheel 4212. The motor 4211 may directly drive the driving wheel 4212 to perform a swing motion, or indirectly drive the driving wheel 4212 to perform the swing motion through the gear mechanism. Those ordinary skilled in the art can understand that the gear mechanism may be a gear or a gear set comprising multiple gears.

The motor 4211 simultaneously transmits power to the cleaning head 410, the driving platform 421, the support platform 422, a liquid delivery mechanism, a liquid container, and etc. through a power transmission device. The power system 160 provides power for the motor 4211, and is controlled by the control system 130 as a whole. The power transmission device may be a gear drive, a chain drive, a belt drive, or a worm gear and so on.

The motor 4211 includes a forward output mode and a reverse output mode. The motor 4211 rotates forward in the forward output mode, and the motor 4211 rotates in a reverse direction in the reverse output mode. In the forward output mode of the motor 4211, the motor 4211 may simultaneously drive, through the power transmission device, the liquid delivery mechanism and the cleaning head 410 in the wet cleaning module 400 to conduct a synchronous movement.

Further, the driving platform 421 further includes a connection rod 4214, which extends along an edge of the driving platform 421, and connects the driving wheel 4212 with the vibration member 4213, so that the vibration member 4213 extends to a preset position. An extension direction of the vibration member 4213 is perpendicular to the connection rod 4214.

The motor 4211 is connected to, through the power transmission device, the driving wheel 4212, the vibration member 4213, the connection rod 4214, and a vibration buffer device 4215. When the wet cleaning module 400 is activated, the motor 4211 starts to rotate forward, and drives, through the driving wheel 4212, the connection rod 4214 to conduct reciprocating movement along a surface of the driving platform 421. At the same time, the vibration buffer device 4215 drives the vibration member 4213 to conduct reciprocating movement along the surface of the driving platform 421. The vibration member 4213 drives the cleaning base plate 4221 to conduct reciprocating movement along the surface of the driving platform 421. The cleaning base plate 4221 drives a movable section 412 to conduct reciprocating movement along the surface to be cleaned. At this time, a clean liquid pump causes clean water to flow out of a liquid container, and the clean water is sprayed on the cleaning head 410 through a liquid outlet device 4217. The cleaning head 410 cleans the surface to be cleaned through the reciprocating movement.

Cleaning strength or efficiency of the autonomous cleaning device may also be adjusted automatically and dynamically according to operation environment of the autonomous cleaning device. For example, the autonomous cleaning device may realize the dynamic adjustment through detecting physical information of the surface to be cleaned by the sensing system 120. For example, the sensing system 120 may detect flatness of the surface to be cleaned, a material of the surface to be cleaned, whether there is oil and dust, and so on, and transmit such information to the control system 130 of the autonomous cleaning device. Accordingly, the control system 130 may control the autonomous cleaning device to automatically and dynamically adjust a rotation speed of the motor and a transmission ratio of the power transmission device according to the operation environment of the autonomous cleaning device, thereby adjusting a preset reciprocating cycle of the reciprocating movement of the cleaning head 410.

For example, when the autonomous cleaning device is in operation on a flat floor, the preset reciprocating cycle may be automatically and dynamically adjusted to be longer, and a liquid volume of the liquid pump may be automatically and dynamically adjusted to be smaller. When the autonomous cleaning device is in operation on a less flat floor, the preset reciprocating cycle may be automatically and dynamically adjusted to be shorter, and the liquid volume of the liquid pump may be automatically and dynamically adjusted to be greater. This is because the flat floor is easier to clean compared to the less flat floor. Therefore, cleaning an uneven floor requires faster reciprocating movement (that is, higher frequency) of the cleaning head 410 and a larger amount of liquid (such as water).

For another example, when the autonomous cleaning device is in operation on a desktop, the preset reciprocating cycle may be automatically and dynamically adjusted to be longer, and the liquid volume of the liquid pump may be automatically and dynamically adjusted to be smaller. When the autonomous cleaning device 100 is in operation on the floor, the preset reciprocating cycle may be automatically and dynamically adjusted to be shorter, and the liquid volume of the liquid pump may be automatically and dynamically adjusted to be greater. This is because compared to the floor, the desktop has less dust and oil, and it is easier to clean a material of the desktop. Therefore, the cleaning head 410 is required to perform less reciprocating movements and the liquid pump provides relatively less liquid (such as water) to clean the desktop.

The support platform 422 includes: a cleaning base plate 4221, which is disposed on the support platform 422 in a freely movable mode. The cleaning base plate 4221 substantively conducts reciprocating movement under vibration of the vibration member 4213. In some embodiments of the present disclosure, the cleaning base plate 4221 includes an assembly notch (not illustrated in the figures) disposed at a position in contact with the vibration member 4213. When the support platform 422 is connected to the driving platform 421, the vibration member 4213 is fitted in the assembly notch, so that the cleaning base plate 4221 can conduct reciprocating movement synchronously along with the vibration member 4213.

Figure 12:
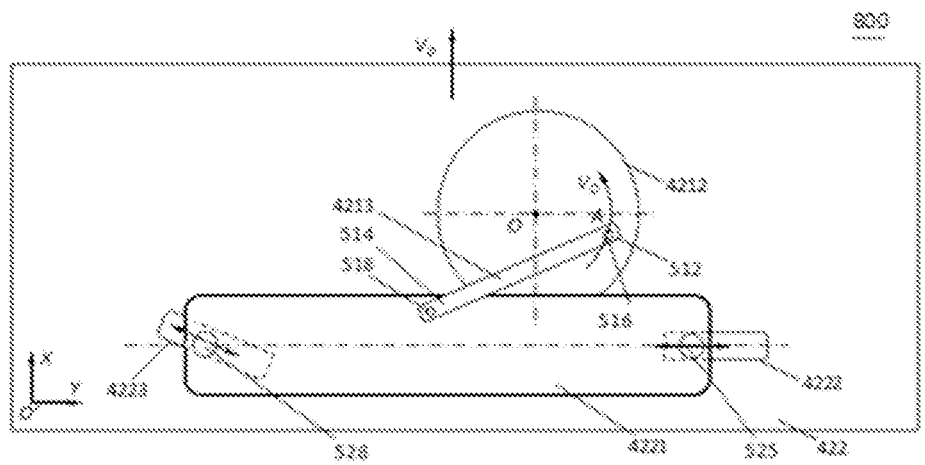
FIG. 12 is a schematic diagram of a cleaning head driving mechanism based on a crank-slider mechanism according to another embodiment of the present disclosure.

FIG. 12 illustrates a cleaning head driving mechanism 800 based on a crank-slider mechanism according to another embodiment of the present disclosure. The cleaning head driving mechanism 800 is applicable to the driving platform 421. The cleaning head driving mechanism 800 includes a driving wheel 4212, a vibration member 4213, a cleaning base plate 4221, a sliding groove 4222 (a first sliding groove), and a sliding groove 4223 (a second sliding groove).

The sliding grooves 4222, 4223 are provided on the support platform 422. Both ends of the cleaning base plate 4221 respectively include a slider 525 (a first slider) and a slider 528 (a second slider). The sliders 525 and 528 are respectively protrusions on both ends of the cleaning base plate 4221. The slider 525 is inserted into the sliding groove 4222 and is slideable along the sliding groove 4222. The slider 4223 is inserted into the sliding groove 4223 and is slideable along the sliding groove 4223. In some embodiments of the present disclosure, the sliding groove 4222 and the sliding groove 4223 are located on one straight line. In some embodiments of the present disclosure, the sliding groove 4222 and the sliding groove 4223 are not located on one straight line. In some embodiments of the present disclosure, the sliding groove 4222 and the sliding groove 4223 extend in a same direction. In some embodiments of the present disclosure, an extending direction of the sliding groove 4222 and the sliding groove 4223 is the same as an extending direction of the cleaning base plate 4221. In some embodiments of the present disclosure, the extending direction of the sliding groove 4222 and the sliding groove 4223 is different from the extending direction of the cleaning base plate 4221. In some embodiments of the present disclosure, the extending direction of the sliding groove 4222 is different from the extending direction of the sliding groove 4223. For example, as illustrated in FIG. 12, the extending direction of the sliding groove 4222 is the same as the extending direction of the cleaning base plate 4221, while the extending direction of the sliding groove 4223 is at a certain angle with respect to the extending direction of the sliding groove 4222.

The vibration member 4213 includes a swinging end 512 and a sliding end 514. The swinging end 512 is connected to the driving wheel 4212 through a first pivot 516, and the sliding end 514 is connected to the cleaning base plate 4221 through a second pivot 518.

A swing center of the driving wheel 4212 is point O, and a pivotal center of the first pivot 516 is point A. The point O and the point A do not coincide with each other, and a distance between them is a preset distance d.

When the driving wheel 4212 rotates, the point A performs a circular swing movement therewith. Accordingly, the swinging end 512 performs a circular swing movement along with the point A. The sliding end 514 drives the cleaning base plate 4221 to perform a sliding movement through the second pivot 518. Accordingly, the slider 525 of the cleaning base plate 4221 performs a linear reciprocating movement along the sliding groove 4222; and the slider 528 performs the linear reciprocating movement along the sliding groove 4223. In FIG. 4, the moving speed of the mobile platform 210 is VO, and the moving direction is a target direction. According to some embodiments of the present disclosure, when the sliding groove 4223 and the sliding groove 4222 are respectively approximately perpendicular to a direction of the moving speed VO of the mobile platform 210, an overall displacement of the cleaning base plate 4221 is perpendicular to the target direction. According to other embodiments of the present disclosure, when any one of the sliding groove 4223 and the sliding groove 4222 have an angle other than 90 degrees with respect to the target direction, overall displacement of the cleaning base plate 4221 includes both a component perpendicular to the target direction and a component parallel to the target direction.

Further, the cleaning head driving mechanism further includes a vibration buffer device 4215, which is disposed on the connection rod 4214 and is configured to reduce the vibration in a certain direction. In an embodiment of the present disclosure, the vibration buffer device 4215 is configured to reduce vibration in the direction of the movement component perpendicular to the target direction of the autonomous cleaning device.

Figure 13:
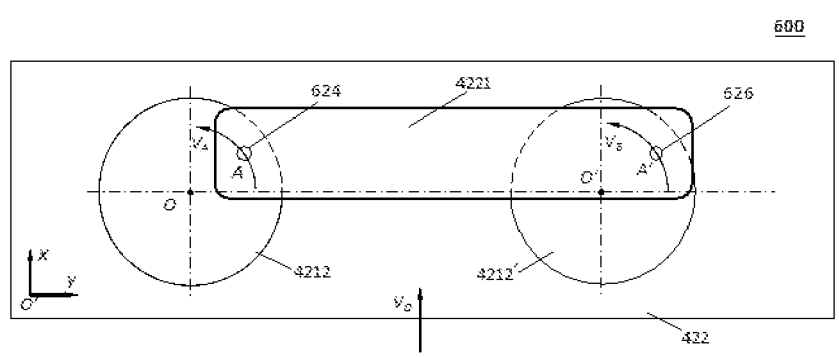
FIG. 13 is a schematic diagram of a cleaning head driving mechanism based on a double-crank mechanism according to another embodiment of the present disclosure.

FIG. 13 illustrates a cleaning head driving mechanism 600 based on a double crank mechanism according to another embodiment of the present disclosure. The cleaning head driving mechanism 600 is applicable to the driving platform 421. The cleaning head driving mechanism 600 includes a driving wheel 4212 (a first driving wheel), a driving wheel 4212' (a second driving wheel), and a cleaning base plate 4221.

The cleaning base plate 4221 has two ends, wherein a first end is connected to the driving wheel 4212 through a pivot 624 (a first pivot), and a second end is connected to the driving wheel 4212' through a pivot 626 (a second pivot). A swing center of the driving wheel 4212 is point O, and a pivotal center of the pivot 624 is point A. The point O and the point A do not coincide with each other, and a distance between them is a preset distance d. A swing center of the driving wheel 236 is point O', and a pivotal center of the pivot 626 is point A'. The point O' and the point A' do not coincide with each other, and a distance between them is the preset distance d. In some embodiments of the present disclosure, the point A, the point A', the point O and the point O' are located on the same plane. Therefore, the driving wheel 4212, the driving wheel 4212' and the cleaning base plate 4221 forms a double crank mechanism (or a parallelogram mechanism), where the cleaning base plate 4221 serves as a coupling rod and the driving wheels 4212, 4212' act as two cranks.

Further, the cleaning head driving mechanism includes a vibration buffer device 4215, which is disposed on the connection rod 4214, and is configured to reduce vibration in a certain direction. In an embodiment of the present disclosure, the vibration buffer device 4215 is configured to reduce vibration in the direction of the movement component perpendicular to the target direction of the autonomous cleaning device.

Figure 14:
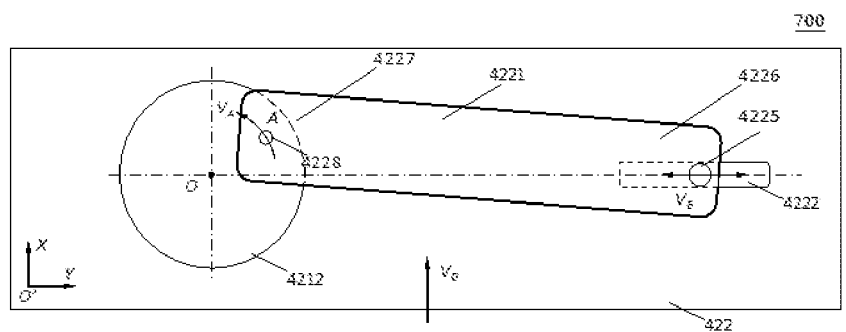
FIG. 14 is a schematic diagram of a cleaning head driving mechanism based on a crank mechanism according to another embodiment of the present disclosure.

FIG. 14 illustrates a cleaning head driving mechanism 700 based on a crank-slider mechanism according to an embodiment of the present disclosure. The cleaning head driving mechanism 700 is applicable to the driving platform 421, and includes a driving wheel 4212, a cleaning base plate 4221 and a sliding groove 4222.

The sliding groove 4222 is provided on the support platform 422. The cleaning base plate 4221 includes a swinging end 4227 and a sliding end 4226. The swinging end 4227 is connected to the driving wheel 4212 through a pivot 4228. A swing center of the driving wheel 4212 is point O, and a pivotal center of the pivot 4228 of the swinging end is point A. The point O and the point A do not coincide with each other, and a distance between them is a preset distance d. The sliding end 4226 includes a slider 4225 that is a protrusion on the sliding end 4226. The slider 4225 is inserted into the sliding groove 4222 and is slideable along the sliding groove 4222. Therefore, the driving wheel 4221, the cleaning base plate 4221, the slider 4225 and the sliding groove 4222 form a crank-slider mechanism.

When the driving wheel 4212 rotates, the point A conducts a circular swing movement. Accordingly, the swinging end 4227 of the cleaning base plate 4221 performs a circular swing movement along with the point A. The slider 4225 slides in the sliding groove 4222 to conduct a linear reciprocating movement. As a result, the cleaning base plate 4221 starts to conduct reciprocating movement. According to some embodiments of the present disclosure, the sliding groove 4222 is approximately perpendicular to the target direction of the moving speed of the mobile platform. Therefore, the linear movement of the sliding end 4226 includes a component perpendicular to the target direction, and the circular swing movement of the swinging end 4227 includes both a component perpendicular to the target direction and a component parallel to the target direction.

In FIG. 14, the moving speed of the mobile platform is VO, and the moving direction is the target direction. The sliding groove 4222 is approximately perpendicular to the target direction. At this time, the reciprocating movement of the cleaning base plate 4221 as a whole has a motion component parallel to the target direction of the autonomous cleaning device and a motion component perpendicular to the target direction of the autonomous cleaning device.

Further, the cleaning head driving mechanism includes a vibration buffer device 4215, which is disposed on the connection rod 4214, and is configured to reduce the vibration in a certain direction. In an embodiment of the present disclosure, the vibration buffer device 4215 is configured to reduce the vibration in the direction of the movement component perpendicular to the target direction of the autonomous cleaning device.

Further, the support platform 422 further includes an elastic detachment button 4229, disposed on at least one side of the support platform 422, and configured to detachably connect the support platform 422 to a claw 4216 of the driving platform 421. At least one fitting section 4224 is disposed on the support platform 422 for fitting the cleaning head 410. The fitting section 4224 may be formed of an adhesive layer having adhesive material.

As illustrated in FIG. 9, the cleaning head 410 includes a movable section 412 connected to the cleaning base plate 4221 and conducting reciprocating movement along the cleaning surface under driving of the cleaning base plate 4221. The movable section 412 is disposed at a central position of the cleaning head 410. An adhesive layer is disposed on a side of the movable section 412 connected to the cleaning base plate 4221. The movable section 412 and the cleaning base plate 4221 are connected through the adhesive layer.

In some embodiments of the present disclosure, the cleaning head 410 further includes a fixed section 411, connected to the bottom part of the support platform 422 through the at least one fitting section 4224. The fixed section 411 cleans at least part of the operation surface with movement of the support platform 422.

Further, the cleaning head 410 further includes a flexible connection part 413, disposed between the fixed section 411 and the movable section 412 and configured to connect the fixed section 411 with the movable section 412. The cleaning head 410 further includes a sliding buckle 414, extending along an edge of the cleaning head 410 and detachably mounted at a buckle position 4225 of the support platform 422.

As illustrated in FIG. 9, the cleaning head 410 may be made of a material having certain elasticity, and the cleaning head 410 is fixed to a surface of the support platform 422 through the adhesive layer, so as to achieve the reciprocating movement. When the cleaning head 410 is in operation, the cleaning head 410 is kept in contact with the surface to be cleaned.

The liquid delivery mechanism includes a liquid outlet device 4217, which may be directly or indirectly connected to a cleaning liquid outlet of the liquid container (not illustrated), such as a liquid outlet of the clean water container. The cleaning liquid may flow to the liquid outlet device 4217 via the cleaning liquid outlet of the liquid container, and may be evenly sprayed onto the surface to be cleaned through the liquid outlet device. The liquid outlet device may be provided with a connection piece (not illustrated in the figure), and the liquid outlet device is connected to the cleaning liquid outlet of the liquid container through the connection piece. The liquid outlet device is provided with a distribution opening, which may be a continuous opening or a combination of several small discontinuous openings. Several nozzles may be disposed at the distribution opening. The cleaning liquid flows to the distribution opening through the cleaning liquid outlet of the liquid container and the connection piece of the liquid outlet device, and is evenly sprayed onto the operation surface through the distribution opening.

The liquid delivery mechanism may further include a clean liquid pump 4219 and/or a clean liquid pump pipe 4218. The clean liquid pump 4219 may directly communicate with the cleaning liquid outlet of the liquid container or communicate with it through the clean liquid pump pipe 4218.

The clean liquid pump 4219 may be connected to the connection piece of the liquid outlet device, and may be configured to pump the cleaning liquid from the liquid container to the liquid outlet device. The clean liquid pump can be a gear pump, a vane pump, a plunger pump, a peristaltic pump, and so on.

The liquid delivery mechanism pumps out the cleaning liquid in the liquid container through the clean liquid pump 4219 and the clean liquid pump pipe 4218, and then deliver the cleaning liquid to the liquid outlet device. The liquid outlet device 4217 may be a nozzle, a drip hole, a soaking cloth, etc., and evenly spread liquid on the cleaning head, so as to wet the cleaning head and the surface to be cleaned. Stains on the wet surface to be cleaned may be cleaned more easily. In the wet cleaning module 400, power or flow rate of the clean liquid pump may be adjusted.

In the wet cleaning module, the cleaning head may conduct reciprocating movement by combining a driving unit and a vibration section. Thus, the surface to be cleaned can be repeatedly cleaned, so that in the movement trajectory of the autonomous cleaning device, a certain area can be cleaned multiple times at one time. This thereby greatly enhances the cleaning effect. Especially for areas with more stains, the cleaning effect is pronounced.

Figure 15:
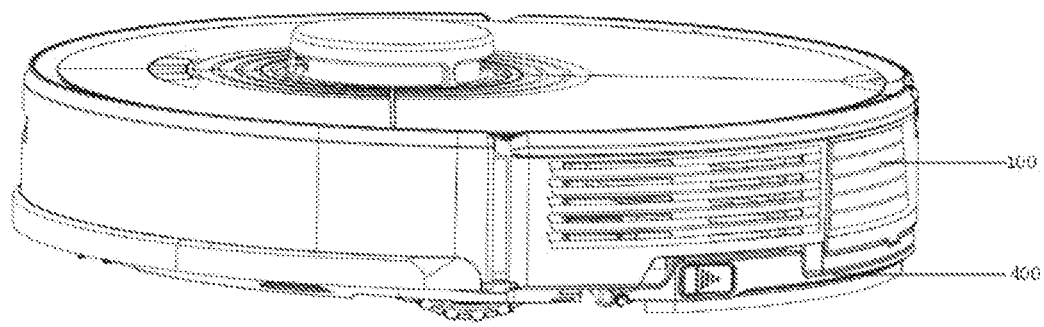
FIG. 15 is a schematic diagram of an autonomous cleaning device in a raised state according to an embodiment of the present disclosure.
Figure 16:
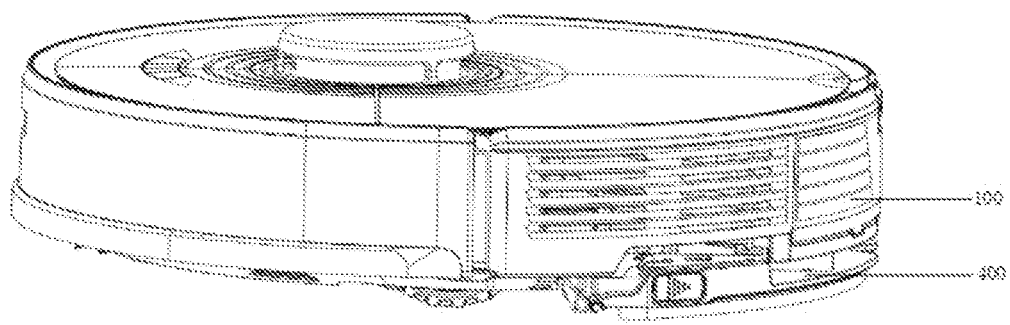
FIG. 16 is a schematic diagram of an autonomous cleaning device in a lowered state according to an embodiment of the present disclosure.

According to an embodiment of the present disclosure, the present disclosure provides a liftable autonomous cleaning device, including: a mobile platform 100, configured to move autonomously on an operation surface: a wet cleaning module 400, movably connected to the mobile platform 100 through a four-linkage lifting structure 500, and is configured to clean at least part of the operation surface in the wet cleaning mode. The four-linkage lifting structure 500 is a parallelogram structure, and is configured to switch the wet cleaning module 400 between a raised state and a lowered state. The raised state is a state where the wet cleaning module 400 leaves the operation surface, as illustrated in FIG. 15. The lowered state is a state where the wet cleaning module 400 is attached onto the operation surface, as illustrated in FIG. 16.

Figure 17:
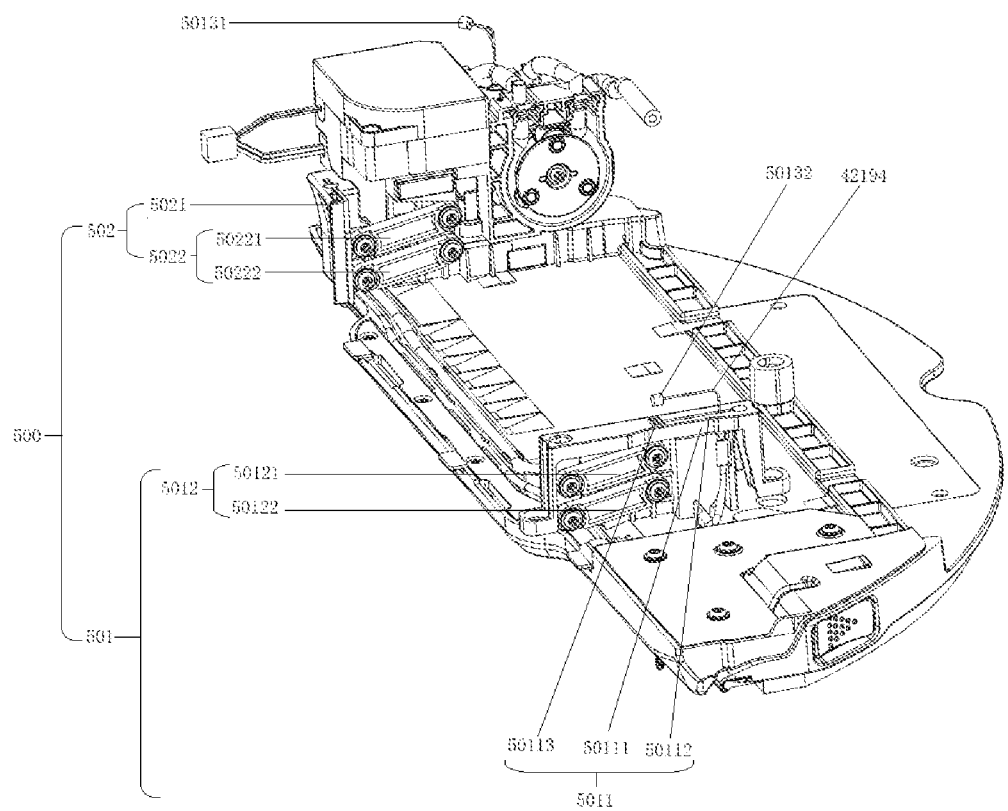
FIG. 17 is a schematic diagram of a four-linkage lifting structure in a raised state according to an embodiment of the present disclosure.
Figure 18:
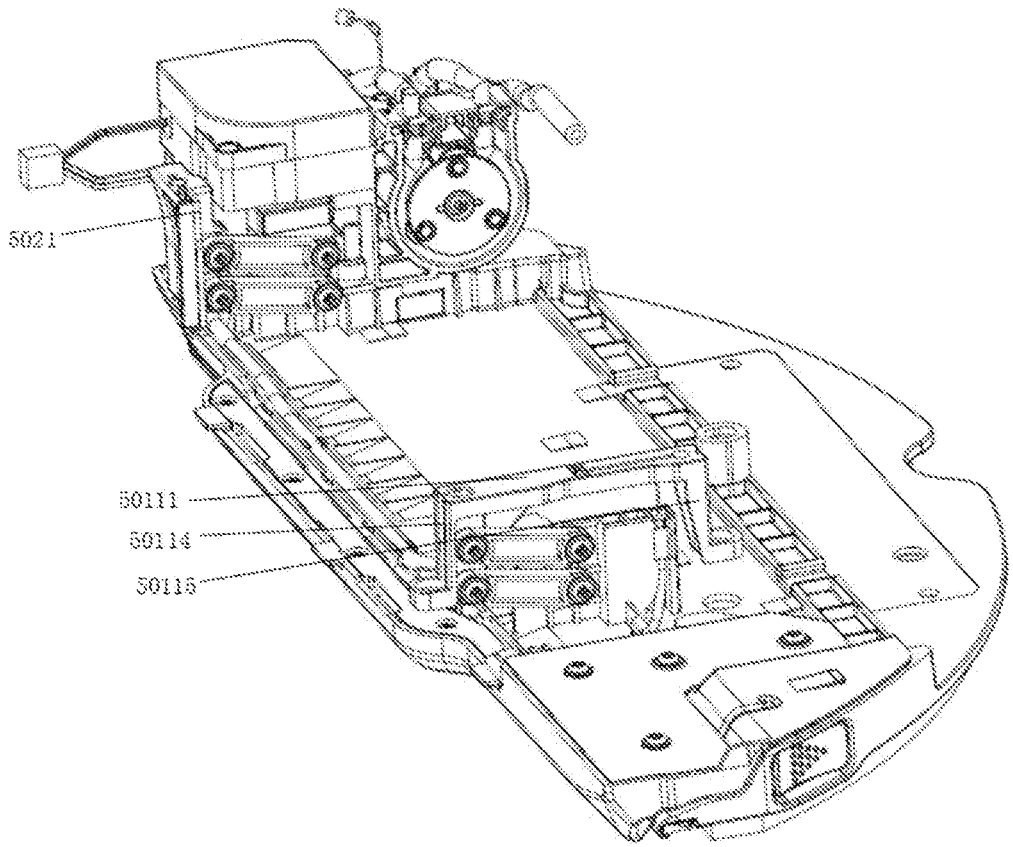
FIG. 18 is a schematic diagram of a four-linkage lifting structure in a lowered state according to an embodiment of the present disclosure.

As illustrated in FIGS. 17-18, the four-linkage lifting structure 500 includes: a first connection end 501, configured to provide an active force to switch the wet cleaning module 400 between the raised state and the lowered state, and a second connection end 502, disposed opposite to the first connection end 501, and rotating under action of the active force. The first connection end 501 and the second connection end 502 are respectively located on each side of the wet cleaning module 400, and raises or lowers the wet cleaning module 400 by stably providing a lifting force.

In some embodiments of the present disclosure, the first connection end 501 includes a first holder 5011 fixedly connected to a bottom part of the mobile platform 100. The first holder 5011 has a substantively n-shaped structure. The first holder 5011 includes a transverse beam 50111, a first longitudinal beam 50114, and a second longitudinal beam 50115. Ends of the first longitudinal beam 50114 and the second longitudinal beam 50115 are respectively fixedly connected to the mobile platform 100 by bolts, so as to provide a support force when the wet cleaning module 400 is being raised and lowered.

The first connection end 501 further includes a first pair of connection rods 5012, having one end rotatably connected to the first holder 5011, and the other end rotatably connected to the wet cleaning module 400. The first pair of connection rods 5012 may have a hollow-out structure, which helps to reduce overall weight of a lifting end.

In some embodiments of the present disclosure, the first pair of connection rods 5012 includes a first connection rod 50121 and a second connection rod 50122 disposed in parallel. First ends of the first connection rod 50121 and the second connection rod 50122 are rotatably connected to the first longitudinal beam 50114 through movable studs, and second ends of the first connection rod 50121 and the second connection rod 50122 are also rotatably connected to the wet cleaning module 400 through movable studs. For example, both ends of the first connection rod 50121 and the second connection rod 50122 are respectively provided with a through hole with a diameter larger than that of the movable stud, so that the movable stud may rotate freely in the through hole, and the movable stud passes through the through hole to be fixedly connected to the first longitudinal beam 50114. When the motor 4211 provides a pulling force to the first end through the cable, the first ends of the first connection rod 50121 and the second connection rod 50122 rotate around the movable studs at the first ends at the same time, and the second end is raised up under action of the pulling force by the cable, so as to raise up the wet cleaning module 400. When the motor 4211 releases the pulling force to the first end through the cable, the first ends of the first connection rod 50121 and the second connection rod 50122 rotate in an opposite direction around the movable studs at the first ends at the same time, and the second end is lowered under action of the gravity, so as to lower down the wet cleaning module 400.

The lifting structure 500 further includes the cable 42194 configured to provide the pulling force, such that the first pair of connection rods 5012 rotates within a preset angle. The cable 42194 includes: a first terminal of the cable 50131 connected to the driving unit 420. For example, the first terminal of the cable 50131 is connected to a gear in a winding way, which is connected to the output shaft of the motor, so as to achieve rising or lowering under rotation of the motor. A second terminal of the cable 50132 is connected to the first holder 5011, and the motor causes the second ends of the first connection rod 50121 and the second connection rod 50122 to rise up or lower down through the cable 42194.

In some embodiments of the present disclosure, the first holder 5011 further includes: a sliding groove 50112 that extends along a surface of the transverse beam 50111, and a buckle hole 50113 that penetrates through the transverse beam 50111 and is disposed at an end of the sliding groove 50112, and is configured to receive and buckle the second terminal of the cable 50132. The cable 42194 is connected to the first ends of the first connection rod 50121 and the second connection rod 50122 through the sliding groove 50112 and the buckle hole 50113. The sliding groove 50112 helps to restrict a moving direction of the cable to provide stability of raising up and lowering down of the module. A width of the sliding groove matches a thickness of the cable.

As illustrated in FIG. 17, the second connection end 502 includes: a second holder 5021, fixedly connected to the bottom part of the mobile platform 100, and a second pair of connection rods 5022, having one end rotatably connected to the second holder 5021, and the other end rotatably connected to the wet cleaning module 400. The second pair of connection rods 5022 rotates as the first pair of connection rods 5012 rotates. The second pair of connection rods 5022 may have a hollow-out structure, which helps to reduce the overall weight of the lifting end.

In some embodiments of the present disclosure, the second pair of connection rods 5022 includes a third connection rod 50221 and a fourth connection rod 50222 disposed in parallel. First ends of the third connection rod 50221 and the fourth connection rod 50222 are rotatably connected to the second holder 5021 through movable studs. Second ends of the third connection rod 50221 and the fourth connection rod 50222 are rotatably connected to the wet cleaning module 400 through movable studs. For example, both ends of the third connection rod 50221 and the fourth connection rod 50222 are respectively provided with a through hole with a diameter greater than that of the movable stud, so that the movable stud may rotate freely in the through hole, and the movable stud passes through the through hole to be fixedly connected to the second holder 5021 and the wet cleaning module 400. When the first connection end 501 is driven by the motor 4211 to rotate, the first ends of the third connection rod 50221 and the fourth connection rod 50222 simultaneously rotate around the movable stud at the first end, and the second ends of the third connection rod 50221 and the fourth connection rod 50222 simultaneously rotates around the movable stud at the second end, so that the wet cleaning module 400 is raised up. When the first connection end 501 releases the pulling force, the third connection rod 50221 and the fourth connection rod 50222 rotate in an opposite direction around the movable stud at the same time, and descend under action of gravity, so that the wet cleaning module 400 is lowered down.

Through the four-linkage lifting structure disposed between the wet cleaning module and the mobile platform, the wet cleaning module may be raised up and lowered down with respect to the mobile platform. When the mopping operation is performed, the wet cleaning module is lowered down to make the wet cleaning module in contact with the floor. When the mopping operation is completed, the wet cleaning module is raised up to separate the wet cleaning module from the floor and to avoid the increased resistance due to the presence of the cleaning module when the cleaning device moves freely on the surface to be cleaned.

In conjunction with sensors such as a surface media sensor that is capable of detecting a surface type of the surface to be cleaned, the lifting module helps to enable the wet cleaning module to perform the cleaning operation according to different surfaces to be cleaned. For example, the lifting module raises up the wet cleaning module up on a carpet surface, and lowers down the wet cleaning module down on a surface such as a floor or floor tile, so as to perform cleaning operation and obtain a more comprehensive cleaning effect.

When the autonomous cleaning device sweeps a floor without carpet along the wall, or a floor corner far away from the carpet, the autonomous cleaning device may sense a distance between the robot body and the wall through a side distance sensor, keep the distance between the robot body and the wall to be constant, move forwards along the wall edge, and sweep the dust at the wall edge into a cleaning area of a main brush of the robot body through a front side brush of the autonomous cleaning device. The wet cleaning module may be also selected to mop the floor.

Figure 19:
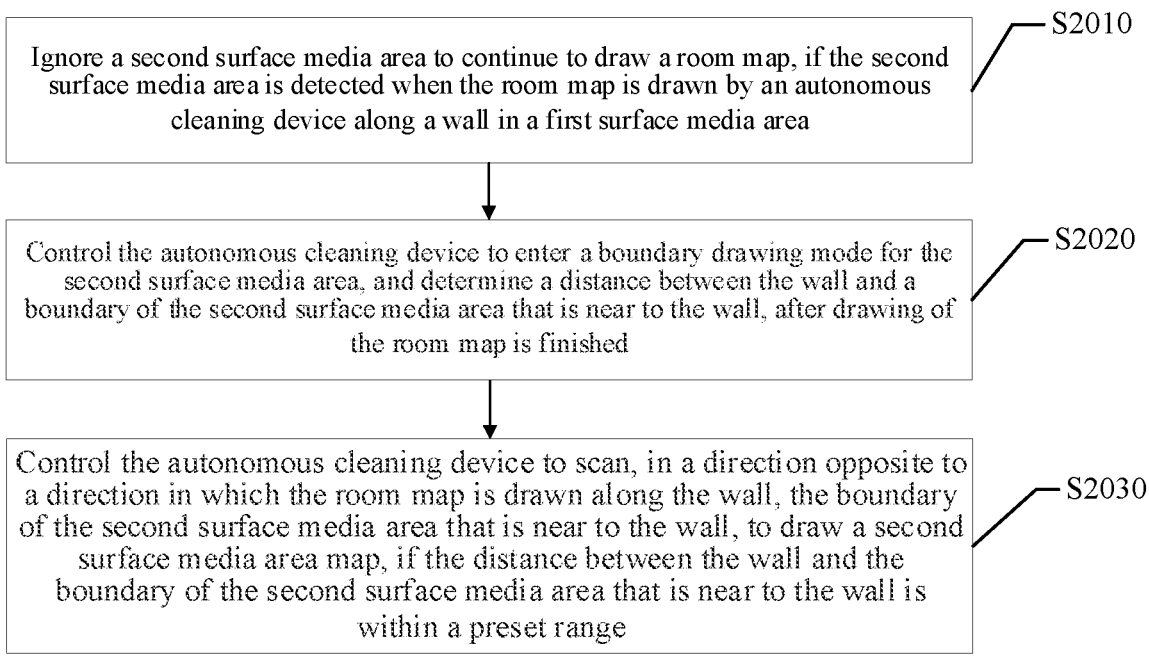
FIG. 19 illustrates a flowchart of a method for drawing an area map according to an embodiment of the present disclosure.

In general, in a case where the autonomous cleaning device detects the carpet during cleaning along a wall, both a room area and a carpet area need to be drawn; and in a case where the wall is close to the carpet, embodiments of the present disclosure provide a method for drawing an area map. Referring to FIG. 19, the method for drawing the area map may include:

in step S2010, a second surface media area is ignored to continue to draw a room map, if the second surface media area is detected when the room map is drawn by an autonomous cleaning device along a wall in a first surface media area;

in step S2020, the autonomous cleaning device is controlled to enter a boundary drawing mode for the second surface media area, and a distance between the wall and a near-wall boundary of the second surface media area is determined after drawing of the room map is finished; and in step S2030, if the distance between the wall and the near-wall boundary of the second surface media area is within a preset range, the autonomous cleaning device is controlled to scan the near-wall boundary of the second surface media area in a direction opposite to a direction of cleaning along the wall, to draw a second surface media area map.

According to the method for drawing the area map provided by embodiments of the present disclosure, during the drawing of the room map and the second surface media area map, the room map is drawn firstly, and then the direction of drawing the near-wall boundary is determined according to the detected distance between the wall and the near-wall boundary of the second surface media area, and the near-wall boundary is scanned in an opposite direction when the near-wall boundary of the second surface media area is closer to the wall, which can avoid the case that an wall-following sensor in the autonomous cleaning device is triggered to affect the scanning of the near-wall boundary, so that the integrity of the drawn second surface media area map and the efficiency of drawing the second surface media area map can be improved.

It should be noted that the first surface media herein is at least one of floor surface medias such as a wooden floor, a carpet, a ceramic tile, and a cement surface. The second surface media is different from the first surface media, and is at least one of floor surface medias such as a wooden floor, the carpet, a ceramic tile, and a cement surface.

Figure 20:
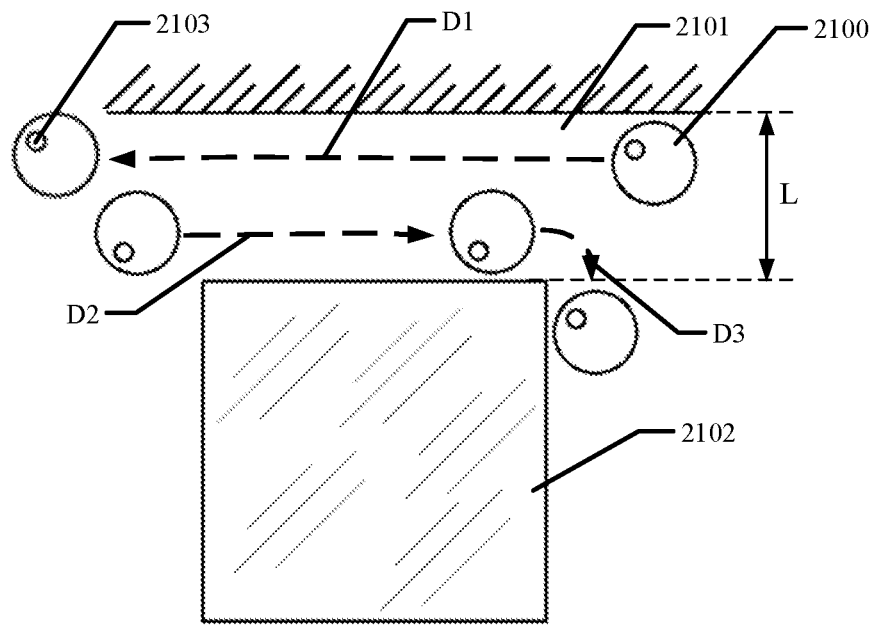
FIG. 20 illustrates a structural path diagram of drawing an area map according to an embodiment of the present disclosure.

Now the method for drawing the area map provided by embodiments of the present disclosure is explained by taking a positional relationship between the wall and the second surface media area as shown in FIG. 20 as an example. It should be noted that the wall also includes other obstacles that may trigger the wall-following sensor, such as a table leg and a chair leg.

As shown in FIG. 20, the autonomous cleaning device 2100 enters a wall-following cleaning mode at the first surface media area 2101 to draw the room map. During the drawing of the room map, the autonomous cleaning device 2100 may detect the second surface media area 2102 through a second surface media area identification device, for example, detect the carpet through a carpet identification device. In this case, in order to ensure the integrity of the drawn room map, the second surface media area 2102 may be ignored first, and the drawing of the room map is continued in the wall-following cleaning mode.

The autonomous cleaning device 2100 may be controlled to enter the boundary drawing mode for the second surface media area after the drawing of the room map is finished, so as to draw the second surface media area.

In the process that the automatic cleaning device 2100 draws the room map in the wall-following cleaning mode, when the second surface media area 2102 is detected, a distance between the robot body and the second surface media area 2102 is also generally sensed by the side distance sensor, and then in conjunction with the above obtained distance between the robot body and the wall, the distance L between the wall and the near-wall boundary of the second surface media area 2102 may be determined.

If the distance L between the wall and the near-wall boundary of the second surface media area 2102 is within the preset range, the autonomous cleaning device may be controlled to scan the near-wall boundary of the second surface media area 2102 in the direction opposite to the direction in which the room map is drawn along the wall, so as to draw the second surface media area map. As shown in FIG. 20, assuming that the direction in which the autonomous cleaning device 2100 draws the room map along the wall is D1, the direction in which the autonomous cleaning device 2100 scans the near-wall boundary of the second surface media area 2102 is D2, and D2 is opposite to D1.

The wall-following sensor 2103 is disposed on a side of the robot body of the autonomous cleaning device to facilitate the wall-following cleaning of the autonomous cleaning device 2100, and the wall-following sensor 2103 needs to be located on a side near the wall during the wall-following cleaning so as to trigger the wall-following cleaning mode. According to embodiments of the present disclosure, the autonomous cleaning device 2100 scans the near-wall boundary of the second surface media area 2102 in the direction opposite to the direction in which the room map is drawn along the wall, and the wall-following sensor 2103 may be located on a side far from the wall, so that the wall-following cleaning mode may be not triggered when the near-wall boundary of the second surface media area 2102 is scanned, the scanning of the near-wall boundary of the second surface media area 2102 is successfully completed, the boundary of the second surface media area 2102 is scanned more completely, and the scanning efficiency is higher.

As shown in FIG. 20, after the scanning of the near-wall boundary of the second surface media area 2102 is finished, the autonomous cleaning device 2100 may be controlled to continue to clean other boundaries along a path D3 so as to obtain a complete second surface media area map. During the drawing of the boundary of the second surface media area 2102, the wall-following sensor 2103 is close to the boundary, and may be not triggered by other obstacles close to the boundary to enter the wall-following cleaning mode, thereby avoiding the occurrence of disordering, ensuring the integrity of the drawn map, and providing the efficiency of drawing the map.

Figure 21:
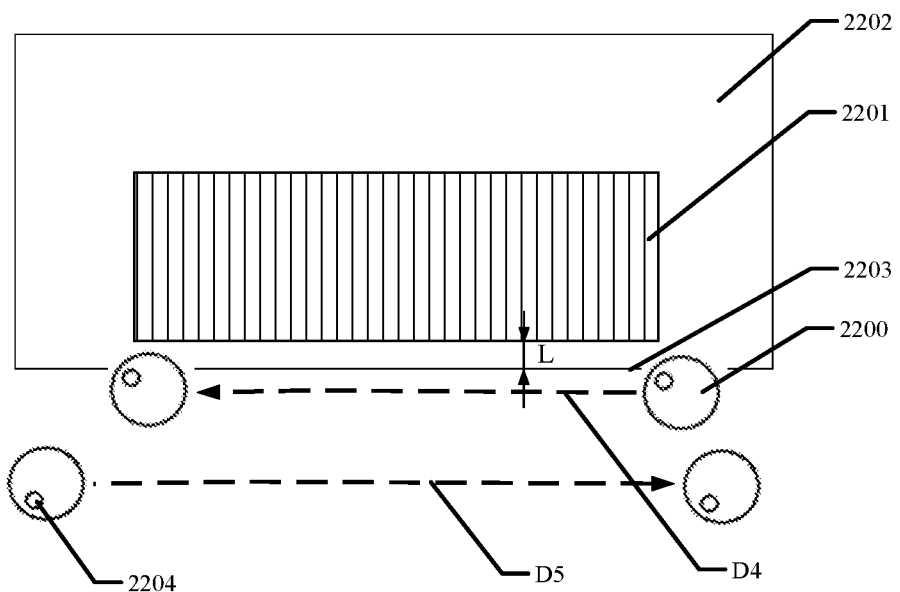
FIG. 21 illustrates another structural path diagram of drawing an area map according to an embodiment of the present disclosure.

With reference to FIG. 21, which illustrates another example applicable to a method for drawing an area map according to an embodiment of the present disclosure, an obstacle 2201 is located on the second surface media area 2202 (e.g., map) in FIG. 21. The obstacle 2201 may easily trigger the wall-following cleaning mode during the sweeping of the autonomous cleaning device 2100 along a path D4. Accordingly, if the distance L between the near-wall boundary of the second surface media area 2102 (i.e., the boundary near the obstacle) and the wall is within the preset range, the autonomous cleaning device 2200 is controlled to scan the near-wall boundary 2203 of the second surface media area 2102 in a direction D5 opposite to the direction D4, so as to draw the second surface media area map. The wall-following sensor 2204 is away from the obstacle 2201, and thus cannot be triggered by the obstacle 2201 to enter the wall-following cleaning mode, thereby avoiding the occurrence of disordering, ensuring the integrity of the drawn map, and providing the efficiency of drawing the map.

In practical applications, the preset range may be specifically set according to an actual situation, for example, the preset range may be set to 1-2 times a width of the autonomous cleaning device, or other values, which is not specially limited in embodiments of the present disclosure.

In embodiments of the present disclosure, the scanning the near-wall boundary of the second surface media area to draw the second surface media area map includes: generating an initialized area by scanning the boundary of the second surface media area.

Figure 22:
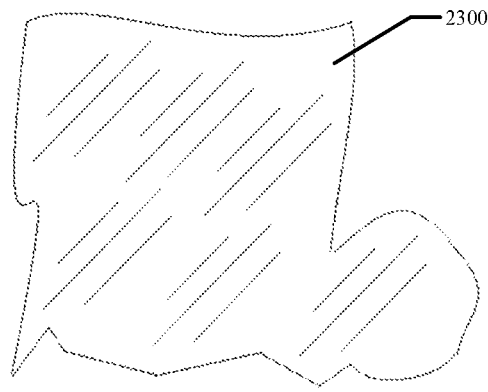
FIG. 22 illustrates a schematic structural diagram of an initialized area after scanning of a second surface media area according to an embodiment of the present disclosure.

In embodiments of the present disclosure, the boundary of the second surface media area may be scanned using the second surface media area identification device, for example, a boundary of a carpet area is scanned using the carpet identification device 103. After the scanning, the initialized area 2300 shown in FIG. 22 may be generated according to the scanned boundary, and is recorded in the autonomous cleaning device.

Figure 23:
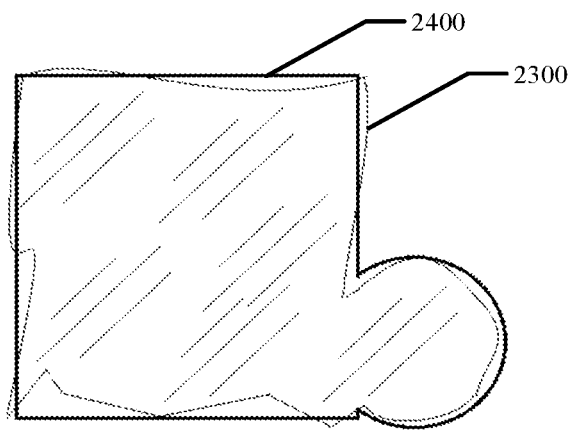
FIG. 23 illustrates a schematic structural diagram of a merged area obtained based on the initialized area shown in FIG. 22.

Next, boundary coordinates of the initialized area 2300 may be merged. For example, adjacent boundary coordinates may be merged into one coordinate, for example, an average of the adjacent boundary coordinates is taken, so as to obtain a merged area 2400 shown in FIG. 23, which has smoother boundaries than the initialized area 2300. In this case, the merged area 2400 may be stored as the second surface media area map in the room map for reference in subsequent cleaning.

Figure 24:
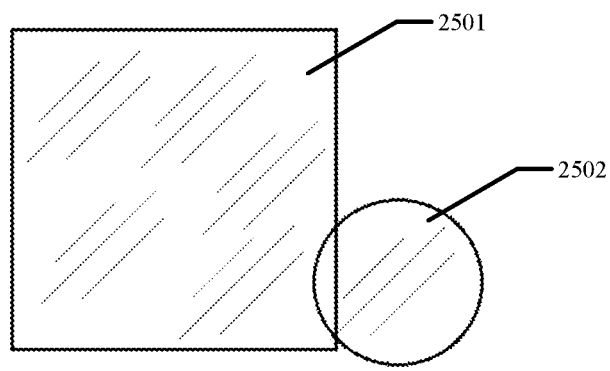
FIG. 24 illustrates a schematic structural diagram of a subarea determined based on the merged area shown in FIG. 23.

In embodiments of the present disclosure, as shown in FIG. 24, the merged area 2400 is split into a plurality of subareas 2501 and 2502 according to a preset shape, and the plurality of subareas 2501 and 2502 are stored in the room map. In a subsequent cleaning process, part of the subareas may be swept as required.

In practical applications, the preset shapes may be a square, a circle, a diamond or other shapes. As shown in FIG. 24, the subarea 2501 determined according to the preset shape is a square area, and the subarea 2502 determined according to the preset shape is a circular area. The embodiments of the present disclosure do not specifically limit specific preset shapes.

After the plurality of subareas are obtained, boundary points of the plurality of subareas may be added as obstacle points to a path search map of the autonomous cleaning device. The autonomous cleaning device may keep away from these obstacle points and find an obstacle-free path to pass when conducting a path search based on the path search map, so as to avoid a jam.

According to the method for drawing the area map provided by embodiments of the present disclosure, the room map and the second surface media area map are drawn in opposite directions, so that the integrity of drawing the map and the efficiency of drawing the map can be improved. In addition, on the basis of the drawn second surface media area map, the plurality of subareas of the second surface media area are obtained, and the obstacle points composed of the boundary points of the plurality of subareas may be taken as a reference in the subsequent cleaning process to assist the automatic cleaning device in cleaning.

In practical applications, the autonomous cleaning device further includes other functions that help to realize the overall operation, which is not elaborated in the exemplary embodiments of the present disclosure.

It should be noted that, although various steps of the method in the present disclosure are described in a specific order depicted in the accompanying drawings, this is not required or implied that the steps must be performed in this specific order, or a desired result may be realized by performing all the steps illustrated. Additionally or alternatively, certain steps may be omitted, a plurality of steps may be combined into one step to execute, and/or one step may be decomposed into a plurality of steps to execute, and the like.

Figure 25:
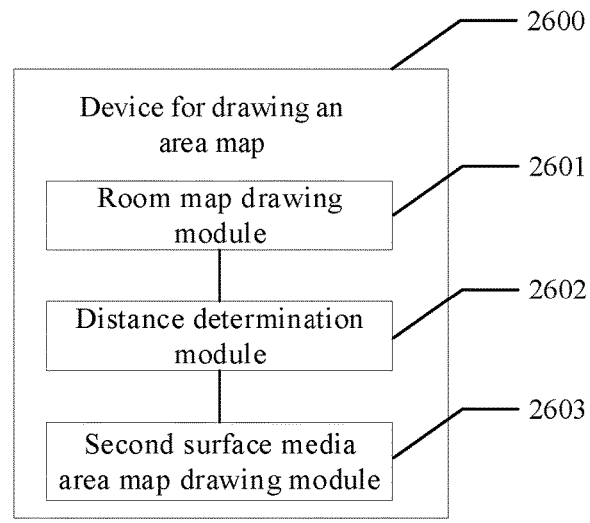
FIG. 25 illustrates a block diagram of a device for drawing an area map according to an embodiment of the present disclosure.

In embodiments of the present disclosure, there is also provided a device for drawing an area map provided in an autonomous cleaning device including a surface media sensor. As shown in FIG. 25, the device 2600 for drawing the area map may include a room map drawing module 2601, a distance determination module 2602, and a second surface media area map drawing module 2603.

The room map drawing module 2601 is configured to ignore a second surface media area to continue to draw a room map, if the second surface media area is detected when the room map is drawn by an autonomous cleaning device along a wall in a first surface media area.

The distance determination module 2602 is configured to control the autonomous cleaning device to enter a boundary drawing mode for the second surface media area, and determine a distance between the wall and a near-wall boundary of the second surface media area, after drawing of the room map is finished.

The second surface media area map drawing module 2603 is configured to, if the distance between the wall and the near-wall boundary of the second surface media area is within a preset range, control the autonomous cleaning device to scan, in a direction opposite to a direction in which the room map is drawn along the wall, the near-wall boundary of the second surface media area to draw a second surface media area map.

Specific details of the above modules of the device for drawing the area map have been described in detail in the corresponding method for drawing the area map, and thus are not described herein again.

It should be noted that, although several modules or units of device for action execution are mentioned in the detailed description above, such division is not mandatory. Indeed, according to embodiments of the present disclosure, the features and functions of two or more modules or units described above may be embodied in one module or unit. Conversely, the features and functions of one of the modules or units described above may be further divided into a plurality of modules or units to embody.

In an exemplary embodiment of the present disclosure, there is provided an electronic device capable of implementing the above method.

Those skilled in the art may understand that various aspects of the present disclosure may be implemented as a system, method, or program product. Therefore, various aspects of the present disclosure may be embodied in the following forms: a complete hardware implementation, a complete software implementation (including firmware, microcode, etc.), or a combination implementation of hardware and software, which may be collectively referred to as 'circuit', 'module', or 'system' herein.

The electronic device 2700 according to an embodiment of the present disclosure is described below with reference to FIG. 26. The electronic device 2700 illustrated in FIG. 26 is merely an example, and should not impose any limitation on the functions and scope of use of embodiment of the present disclosure.

Figure 26:
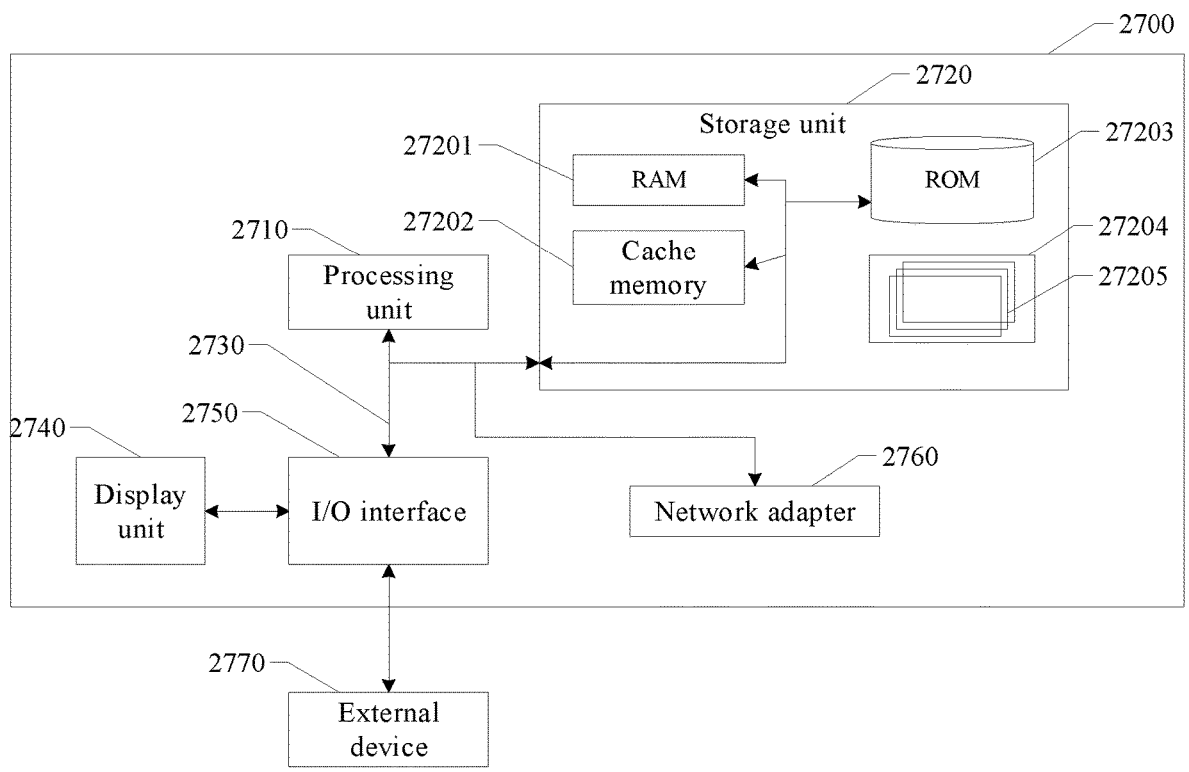
FIG. 26 illustrates a modular schematic diagram of an electronic device according to an embodiment of the present disclosure.

As illustrated in FIG. 26, the electronic device 2700 is expressed in the form of a general-purpose computing device. Components of the electronic device 2700 may include, but are not limited to, at least one processing unit 2710, at least one storage unit 2720, a bus 2730 connecting different system components (including the storage unit 2720 and the processing unit 2710), and a display unit 2740.

The storage unit 2720 stores program codes, and the program codes may be executed by the processing unit 2710, so that the processing unit 2710 executes various steps of the exemplary embodiments according to the present disclosure described in the above-mentioned section of the specification. For example, the processing unit 2710 may perform the steps in FIG. 19. In the step S2010, a second surface media area is ignored to continue to draw a room map, if the second surface media area is detected when the room map is drawn by an autonomous cleaning device along a wall in a first surface media area. In the step S2020, the autonomous cleaning device is controlled to enter a boundary drawing mode for the second surface media area, and a distance between the wall and a near-wall boundary of the second surface media area is determined after drawing of the room map is finished. In the step S2030, if the distance between the wall and the near-wall boundary of the second surface media area is within a preset range, the autonomous cleaning device is controlled to scan the near-wall boundary of the second surface media area in a direction opposite to a direction of cleaning along the wall, to draw a second surface media area map.

The storage unit 2720 may include a readable medium in the form of a volatile storage unit, such as a random access storage unit (RAM) 27201 and/or a cache storage unit 27202. It may further include a read-only storage unit (ROM) 27203.

The storage unit 2720 may further include a program or utility tool 27204 having a set of (at least one) program modules 27205. Such program modules 27205 include, but are not limited to, an operating system, one or more application programs, other program modules, and program data. Each or some combination of these examples may include an implementation of a network environment.

The bus 2730 indicates one or more bus structures of various types, and includes a storage unit bus or a bus structure applicable to a storage unit controller, a peripheral bus, a graphics acceleration port, a processing unit, or a local bus that uses various bus structures.

The electronic device 2700 may further communicate with one or more peripheral devices 2770 (such as a keyboard, pointing device, Bluetooth device, etc.). It may further communicate with one or more devices that enable a user to interact with the electronic device 2700, and/or communicate with any device (e.g., router, modem, etc.) that enables the electronic device 2700 to communicate with one or more other computing devices. Such communication may be performed through an input/output (I/O) interface 2750. Moreover, the electronic device 2700 may further communicate with one or more networks (such as a local area network (LAN), a wide area network (WAN), and/or a public network, such as the Internet) through the network adapter 2760. As illustrated, the network adapter 2760 communicates with other modules of the electronic device 2700 through the bus 2730. It should be understood that although not illustrated in the figures, other hardware and/or software modules may be used in conjunction with the electronic device 2700, comprising, but not limited to, microcode, device drivers, redundant processing units, external disk drive arrays, RAID systems, tape drives, data backup storage systems, and the like.

Through the description of the above embodiments, those skilled in the art will readily understand that the exemplary embodiments described here may be implemented by software or by software in combination with necessary hardware. Therefore, the technical solution according to embodiments of the present disclosure may be embodied in a form of software product, which may be stored in a non-volatile storage medium (which may be a CD-ROM, a USB disk, a mobile hard disk, etc.) or on a network, including a number of instructions to enable a computing device (which may be a personal computer, a server, a terminal device, or a network device, etc.) to perform the methods according to embodiments in the present disclosure.

In an exemplary embodiment of the present disclosure, there is also provided a computer-readable storage medium on which a program product capable of implementing the above-mentioned method of the present disclosure is stored. In some possible implementation modes, aspects of the present disclosure may also be implemented in the form of a program product, which includes program code. When the program product runs on a terminal device, the program code is used to cause the terminal device to perform the steps according to various exemplary embodiments of the present disclosure described in the above-mentioned section of the present specification.

A program product for implementing the above method according to an embodiment of the present disclosure can use a portable compact disc read-only memory (CD-ROM) and include the program code, which may run on a terminal device, for example, personal computer. However, the program product of the present disclosure is not limited thereto. In the present description, the readable storage medium may be any tangible medium containing or storing program, and the program may be used by or in combination with an instruction execution system, apparatus, or device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of the readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as a part of a carrier wave, which carries readable program code. Such a propagated data signal may take many forms, comprising but not limited to electromagnetic signals, optical signals, or any suitable combination of the foregoing. The readable signal medium may also be any readable medium other than a readable storage medium. The readable medium may send, propagate, or transmit a program for use by or in combination with an instruction execution system, apparatus, or device.

The program code contained on the readable medium may be transmitted using any appropriate medium, comprising but not limited to wireless, wired, optical cable, RF, etc., or any suitable combination of the foregoing.

The program code for performing the operations of the present disclosure may be written in any combination of one or more programming languages, which include object-oriented programming languages, such as Java, C++, etc. and further include conventional procedural programming language, such as 'C' or a similar programming language. The program code may be executed entirely or partly on the user computing device, may be executed as an independent software package, may be executed partly on the user computing device and partly on the remote computing device, or may be executed entirely on the remote computing device or server. In case that remote computing devices are involved, the remote computing devices may be connected to the user computing device via any kind of network, such as a local area network (LAN) or a wide area network (WAN). Alternatively, it may be connected to external computing devices, for example, connected to external computing devices, via the Internet by use of an Internet service provider.

In addition, the above-mentioned drawings are merely a schematic description of process included in the method of an exemplary embodiment of the present disclosure, and are not intended to be limiting. It is easy to understand that the processes illustrated in the above drawings does not indicate or limit the chronological order of these processes. In addition, it is also easy to understand that these processes may be performed synchronously or asynchronously in a plurality of modules, for example.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A method for drawing an area map, comprising:
   ignoring a second surface media area to continue to draw a room map, if the second surface media area is detected when the room map is drawn by an autonomous cleaning device along a wall in a first surface media area;
   controlling the autonomous cleaning device to enter a boundary drawing mode for the second surface media area, and determining a distance between the wall and a near-wall boundary of the second surface media area, after drawing of the room map is finished; and
   controlling the autonomous cleaning device to scan, in a direction opposite to a direction in which the room map is drawn along the wall, the near-wall boundary of the second surface media area, to draw a second surface media area map, if the distance between the wall and the near-wall boundary of the second surface media area is within a preset range.

2. The method for drawing the area map according to claim 1, wherein scanning the near-wall boundary of the second surface media area to draw the second surface media area map comprises:
   generating an initialized area by scanning a boundary of the second surface media area, and recording the initialized area; and
   obtaining, by merging boundary coordinates of the initialized area, a merged area as the second surface media area map, and storing the merged area in the room map.

3. The method for drawing the area map according to claim 2, wherein the obtaining, by merging the boundary coordinates of the initialized area, the merged area comprises:
   obtaining, by merging adjacent boundary coordinates of the initialized area, the merged area.

4. The method for drawing the area map according to claim 2, wherein the method further comprises:
   splitting the merged area into a plurality of subareas according to a preset shape, and storing the plurality of subareas in the room map.

5. The method for drawing the area map according to claim 4, wherein the preset shape is one of a square, a circle and a diamond.

6. The method for drawing the area map according to claim 4, wherein the method further comprises:
   adding boundary points of the plurality of subareas as obstacle points to a path search map of the autonomous cleaning device.

7. The area map drawing method according to claim 1, wherein the preset range is 1-2 times a width of the autonomous cleaning device.

8. A non-transitory computer-readable storage medium having a computer program stored thereon which is configured to, when executed by a processor, implement;
   ignoring a second surface media area to continue to draw a room map, if the second surface media area is detected when the room map is drawn by an autonomous cleaning device along a wall in a first surface media area;
   controlling the autonomous cleaning device to enter a boundary drawing mode for the second surface media area, and determining a distance between the wall and a near-wall boundary of the second surface media area, after drawing of the room map is finished; and controlling the autonomous cleaning device to scan, in a direction opposite to a direction in which the room map is drawn along the wall, the near-wall boundary of the second surface media area, to draw a second surface media area map, if the distance between the wall and the near-wall boundary of the second surface media area is within a preset range.

9. An electronic device, comprising:

a processor; and a memory, configured to store executable instructions of the processor, wherein the processor is configured to perform the following operations by executing the executable instructions:

ignoring a second surface media area to continue to draw a room map, if the second surface media area is detected when the room map is drawn by an autonomous cleaning device along a wall in a first surface media area;

controlling the autonomous cleaning device to enter a boundary drawing mode for the second surface media area, and determining a distance between the wall and a near-wall boundary of the second surface media area, after drawing of the room map is finished; and controlling the autonomous cleaning device to scan, in a direction opposite to a direction in which the room map is drawn along the wall, the near-wall boundary of the second surface media area, to draw a second surface media area map, if the distance between the wall and the near-wall boundary of the second surface media area is within a preset range.

10. The electronic device according to claim 9, wherein the processor is further configured to perform the following operations by executing the executable instructions:

generating an initialized area by scanning a boundary of the second surface media area, and recording the initialized area; and obtaining, by merging boundary coordinates of the initialized area, a merged area as the second surface media area map, and storing the merged area in the room map.

11. The electronic device according to claim 10, wherein the processor is further configured to perform the following operation by executing the executable instructions:

obtaining, by merging adjacent boundary coordinates of the initialized area, the merged area.

12. The electronic device according to claim 10, wherein the processor is further configured to perform the following operations by executing the executable instructions:

splitting the merged area into a plurality of subareas according to a preset shape, and storing the plurality of subareas in the room map.

13. The electronic device according to claim 12, wherein the preset shape is one of a square, a circle and a diamond.

14. The electronic device according to claim 12, wherein the processor is further configured to perform the following operation by executing the executable instructions:

adding boundary points of the plurality of subareas as obstacle points to a path search map of the autonomous cleaning device.

15. The electronic device according to claim 9, wherein the preset range is 1-2 times a width of the autonomous cleaning device.

16. The non-transitory computer-readable storage medium according to claim 8, wherein the computer program is further configured to:

generate an initialized area by scanning a boundary of the second surface media area, and record the initialized area; and obtain, by merging boundary coordinates of the initialized area, a merged area as the second surface media area map, and store the merged area in the room map.

17. The non-transitory computer-readable storage medium according to claim 16, wherein the computer program is further configured to:

obtain, by merging adjacent boundary coordinates of the initialized area, the merged area.

18. The non-transitory computer-readable storage medium according to claim 16, wherein the computer program is further configured to:

split the merged area into a plurality of subareas according to a preset shape, and store the plurality of subareas in the room map.

19. The non-transitory computer-readable storage medium according to claim 18, wherein the preset shape is one of a square, a circle and a diamond.

20. The non-transitory computer-readable storage medium according to claim 18, wherein the computer program is further configured to:

add boundary points of the plurality of subareas as obstacle points to a path search map of the autonomous cleaning device.

* * * * *